US011418596B2

(12) United States Patent
Chau et al.

(10) Patent No.: US 11,418,596 B2
(45) Date of Patent: Aug. 16, 2022

(54) PROXIMITY ROUTING POLICY ENFORCEMENT FOR TRANS-BORDER INTERNET OF THINGS DATA GOVERNANCE COMPLIANCE

(71) Applicants: AT&T Global Network Services Hong Kong LTD, Island East (HK); AT&T Mobility II LLC, Atlanta, GA (US)

(72) Inventors: Winnie Chau, Hong Kong (HK); John Philip Mulligan, Island South (HK); Shashi Gowda, Lantau Island (HK)

(73) Assignees: AT&T Global Network Services Hong Kong LTD, Hong Kong (HK); AT&T Mobility II LLC, Atlanta, GA (US)

( * ) Notice: Subject to any disclaimer, the term of this patent is extended or adjusted under 35 U.S.C. 154(b) by 145 days.

(21) Appl. No.: 16/856,135

(22) Filed: Apr. 23, 2020

(65) Prior Publication Data
US 2021/0337027 A1 Oct. 28, 2021

(51) Int. Cl.
*H04L 67/12* (2022.01)
*G16Y 40/35* (2020.01)
*H04L 45/02* (2022.01)
*G16Y 40/10* (2020.01)
*G16Y 40/20* (2020.01)

(52) U.S. Cl.
CPC ............. *H04L 67/12* (2013.01); *G16Y 40/10* (2020.01); *G16Y 40/20* (2020.01); *G16Y 40/35* (2020.01); *H04L 45/02* (2013.01)

(58) Field of Classification Search
CPC ......... H04L 67/12; H04L 45/02; G16Y 40/10; G16Y 40/20; G16Y 40/35
See application file for complete search history.

(56) References Cited

U.S. PATENT DOCUMENTS

| 2016/0142966 | A1* | 5/2016 | Aboughanaima ... H04L 65/1073 370/328 |
| 2016/0234113 | A1* | 8/2016 | Constantinescu ..... H04L 45/745 |
| 2021/0084470 | A1* | 3/2021 | Chen ....................... H04L 69/40 |

* cited by examiner

*Primary Examiner* — Walter J Divito
(74) *Attorney, Agent, or Firm* — Hartman & Citrin LLC

(57) ABSTRACT

The concepts and technologies disclosed herein are directed to proximity routing policy enforcement for trans-border Internet of Things ("IoT") data governance compliance. A network gateway can receive, from a data source device, a device registration message comprising a device registration header. The network gateway can determine, based upon the device registration header and a data governance policy, whether the data source device is permitted to access a data governance zone. In response to determining that the data source device is permitted to access the data governance zone, the network gateway can determine, based upon a further data governance policy, at least one gateway of a plurality of gateways operating in the data governance zone to which the device registration message is to be forwarded. The network gateway can forward the registration message to the at least one gateway so that the at least one gateway is enabled for device operation.

17 Claims, 15 Drawing Sheets

PROXIMITY ROUTING POLICY ENFORCEMENT FOR TRANS-BORDER INTERNET OF THINGS DATA GOVERNANCE COMPLIANCE

BACKGROUND

Trans-border Internet of Things ("IoT") solutions, such as fleet management and logistics, face complex regulatory and data governance compliance requirements throughout the lifecycle of an IoT device. Maintaining data governance compliance can be especially challenging near national borders. Currently, there are no viable market solutions for trans-border IoT devices that address this problem. Solutions do exist that can be configured for static, stationary IoT devices that are installed for monitoring fixed assets. These solutions can be designed to comply with specific countries (or regions) by placing all related IoT infrastructure within a specific county (or region) and ensuring that all stages of data processing (i.e., data collection, data transportation, data processing, and data storage/retrieval) all comply with the data governance guidelines of that specific country or region. However, IoT devices that are affixed to moving assets, such as shipping containers or vehicles, often cross borders, and the stages of IoT data processing can be subject to regulatory obligations relative to device location.

SUMMARY

Concepts and technologies disclosed herein are directed to aspects of proximity routing policy enforcement for trans-border IoT data governance compliance. According to one aspect of the concepts and technologies disclosed herein, a network gateway can include a processor and a memory. The memory can include instructions that, when executed by the processor, cause the processor to perform operations. In particular, the network gateway can receive, from a data source device, a device registration message that includes a device registration header. The network gateway can determine, based upon the device registration header and a data governance policy, whether the data source device is permitted to access a data governance zone. In response to determining that the data source device is permitted to access the data governance zone, the network gateway can determine, based upon a further data governance policy, at least one gateway of a plurality of gateways operating in the data governance zone to which the device registration message is to be forwarded. The plurality of gateways can include a device gateway and at least one third party gateway. The network gateway can forward the registration message to the at least one gateway so that the at least one gateway is enabled for device operation.

In some embodiments, the device registration message can include a plurality of data fields. A data field can uniquely identify the data source device. For example, a data field can include a device IP address, an Integrated Circuit Card ID ("ICCID"), an International Mobile Subscriber Identity ("IMSI"), a network module serial number, an International Mobile Equipment Identity ("IMEI"), or some combination thereof. A data field can uniquely identify a network location of the data source device. For example, a data field can include a location area code ("LAC"), a cell-ID, or a combination thereof. A data field can uniquely identify a network to which the data source device is connected. For example, a data field can include a mobile country code ("MCC"), a mobile network code ("MNC"), a radio access technology ("RAT"), or some combination thereof.

In some embodiments, the network gateway can receive, from the data source device, a data message that includes a plurality of data segments. The plurality of data segments can include a first data segment associated with a network owner, a second data segment associated with a device owner, and a third data segment associated with a third party owner. The network gateway can be associated with the network owner. The device gateway can be associated with the device owner. The third party gateway can be associated with the third party owner.

In some embodiments, the data governance zone is a home data governance zone and the network gateway is a home network gateway. In these embodiments, in response to determining, based upon the device registration header and the data governance policy, that the data source device is not permitted to access the home data governance zone, the network gateway can generate a registration redirect message to inform the data source device of a visited network gateway to which the device registration message should be redirected. The visited network gateway can be associated with a visited data governance zone. The data source device can receive the registration redirect message and attempt to register with the visited network gateway. After successful registration with the visited network gateway, the data source device can send a data message to the visited network gateway. The home network gateway can receive, from the visited network gateway, a transaction identifier that uniquely identifies the data messages between the data source device and the visited network gateway.

In some embodiments, the data source device is an IoT device. In some other embodiments, the data source device is a combination device that includes an IoT device and an asset. The asset can be an autonomous agent that meets the definition of a "machine" in accordance with machine-to-machine ("M2M") standards. As such, the asset can be a computing element with a network interface. The asset alternatively can be or can include, but is not limited to, a product or good, a box that contains one or more products/goods, a cargo box that contains one or more products/goods, a pallet that contains one or more cargo boxes, a container that contains at least one pallet, or any other storage and/or shipping configuration. Other assets can be associated with smart technologies, such as smart buildings, smart cities, smart health, smart manufacturing, smart factories, and the like, among other concepts associated with the fourth industrial revolution (also known as "Industry 4.0"). In some instances, an asset can be an individual or group of individuals. The type of asset should not be limited in any way. Moreover, the industries to which the concepts and technologies disclosed herein may be applied should not be limited in any way.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1A:
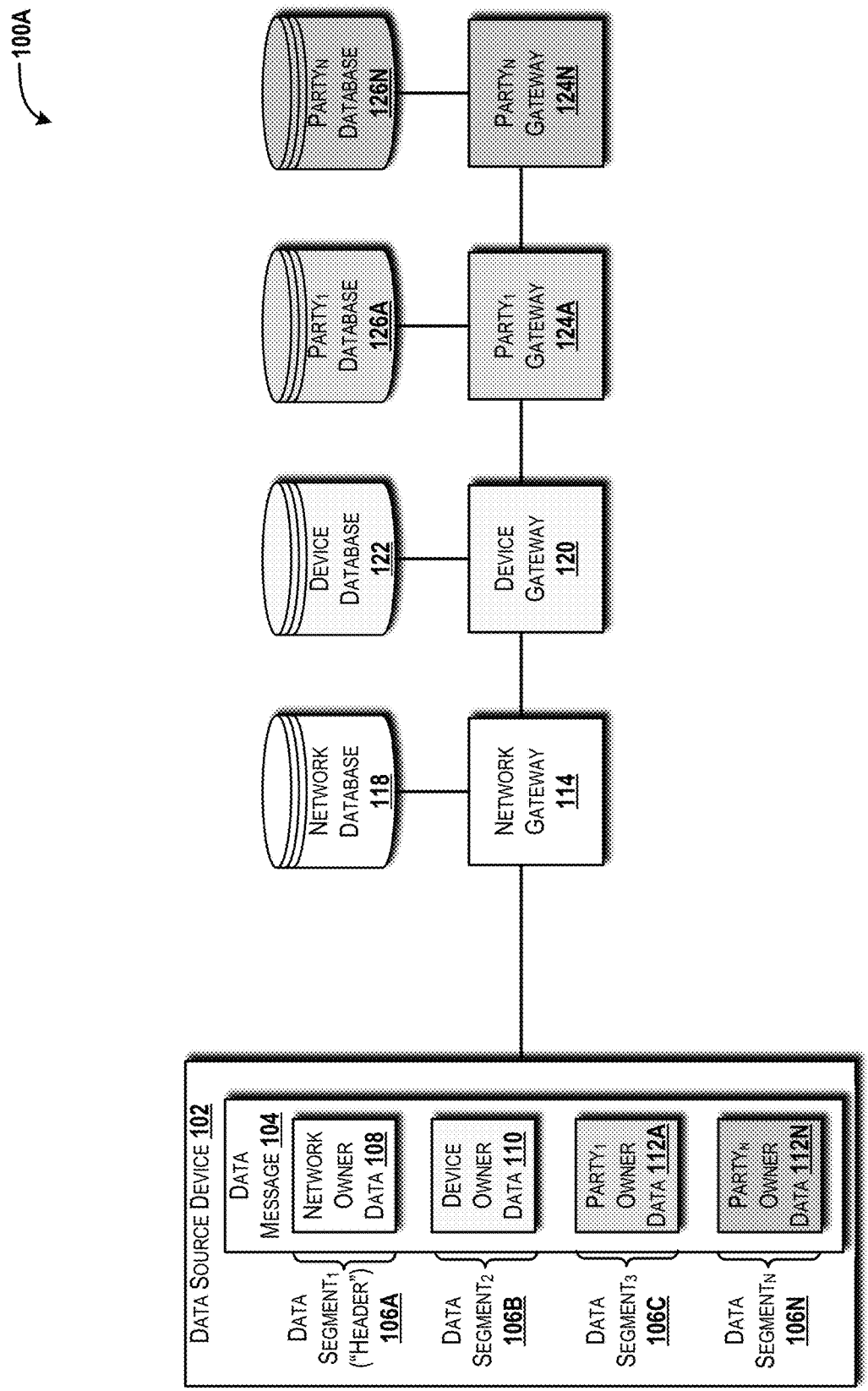
FIGS. 1A-1F are block diagrams illustrating aspects of an illustrative operating environment in different configurations and in which the concepts and technologies disclosed herein can be implemented.

The concepts and technologies disclosed herein provide an IoT protocol with a network gateway that can dynamically adjust the compliance of IoT data being processed for individual IoT devices. IoT devices can communicate any change of any combination of network parameters (e.g., mobile network) to the network gateway so that an appropriate routing and governance rule set (including one or more rules) can be established for IoT data flow, including redirection to a separate and geographically distinct network gateway. The IoT device can constantly monitor and detect any change to its specific network parameters, and upon detection, can request a new rule set or can be assigned a new rule set, which can be established between the IoT device and the network gateway. This rule set can define the guidelines for data collection, data transportation, data processing, data storage, and data retrieval. If the IoT device collects data from individuals, the rule set can additionally include regional and market compliant guidelines for privacy as well as user managed access for IoT data retrieval, both real-time and archived. In addition, the network gateway can support specialized regulatory requirements such as those implemented by law enforcement. For example, a law enforcement agency may request surveillance of IoT assets that may need monitoring within certain countries or regions.

As countries globally implement cyber security laws, privacy guidelines, and encryption restrictions, it can be a tremendous burden for IoT device and platform providers to confidently deploy solutions for assets that cross national borders. By providing a secure protocol and regulator-aware middleware platform, telecommunications service providers, such as AT&T, are uniquely positioned to help both solutions providers and enterprises that require these solutions to be deployed with confidence. The concepts and technologies disclosed herein can allow telecommunications service providers, such as AT&T, to function as an "Ecosystem Facilitator," enabling unique IoT and emerging technology use cases with rapid transitions from proof of concept to operational support across a wide range of industries. The disclosed concepts and technologies address a void created by existing IoT solution providers and provide a solution that the market needs to accelerate innovation with an almost negligible risk to return on investment. The disclosed concepts and technologies will allow telecommunications service providers, such as AT&T, to foster and grow an ecosystem of device and systems integration partners across almost every emerging technology industry. For large, existing enterprise customers, this ecosystem will put telecommunications service providers, such as AT&T, in the position of picking the best-of-breed partners from across the ecosystem to solve critical customer needs rapidly and with a level of solution quality that competitive solutions will not be able to match. Moreover, the concepts and technologies disclosed herein will allow companies, such as AT&T, to foster and grow ecosystems of device owners, data owners, sellers, and users along a supply chain that, together with systems integration partners across emerging technology industries, can add additional participants to the supply chain so they can operate on the ecosystem developed for that chain.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of systems, devices, computer-readable storage mediums, and methods for proximity routing policy enforcement for trans-border IoT data governance compliance will be described.

FIGS. 1A-1E illustrate an operating environment 100A-100E in various configurations in which the concepts and technologies disclosed herein can be implemented in accordance with exemplary embodiments. Turning first to FIG. 1A, the operating environment 100A includes a data source device 102 that can create a multi-party data owner ("MPDO") data message 104 (hereinafter "data message 104") that contains a plurality of data segments 106A-106N, each of which is owned by a different party. The data message 104 can be used to provide data to any number of parties. The term "owner," as used herein, is the party/entity within a data message flow that has proprietary ownership of one or more data segments 106 of the data message 104 generated by the data source device 102.

In the illustrated example, the data segment$_1$ 106A is owned by a network provider or network owner, and includes network owner data 108; the data segment$_2$ 106B is owned by a device manufacturer or device owner, and includes device owner data 110; and the data segment$_3$ through data segmenter$_N$ 106C-106N are owned by different third parties, and include party$_1$ owner data 112A and party$_N$ owner data 112N. The data source device 102 can provide an encrypted version (not shown) of the data message 104 to each owner in a sequence, and each owner can decrypt and consume the encrypted version of their respective data segment 106. For example, the data source device 102 can send an encrypted version of the data message 104 to a network gateway 114 that can decrypt the network owner data 108 in the data segment$_1$ 106A using its own decryption key (the various decryption keys also are not shown), and can store the decrypted version of the network owner data 108 in a network database 118. The network gateway 114, in turn, can provide a modified version of the encrypted version of the data message 104 (i.e., the encrypted version of the data message 104 with the network owner data 108 removed) to a device gateway 120 that can decrypt the device owner data 110 in the data segment$_2$ 106B via its own decryption key, and can store the decrypted version of the device owner data 110 in a device database 122. The device gateway 120, in turn, can provide a modified version of the encrypted version of the data message 104 (i.e., the encrypted version of the data message 104 with the network owner data 108 and the device owner data 110 removed) to a party$_1$ gateway 124A that can decrypt the party$_1$ owner data 112A in the data segment$_3$ 106C via its own decryption key, and can store the decrypted version of the party$_1$ owner data 112A in a party$_1$ database 126. The party$_1$ gateway 124A, in turn, can provide a modified version of the encrypted version of the data message 104 (i.e., the encrypted version of the data message 104 with the network owner data 108, the device owner data 110, and the party$_1$ owner data 112A removed) to a party$_N$ gateway 124N that can decrypt the party$_N$ owner data 112N in the data segmenter 106N via its own decryption key, and can store the decrypted version of the party$_N$ owner data 112N in a party$_N$ database 126N. This message flow is based upon a zero-knowledge proof that can be integrated into a network communications protocol. Additional details about the zero-knowledge proof are provided in U.S. patent application Ser. No. 16/722,586, filed Dec. 20, 2019, which is incorporated herein by reference in its entirety.

It should be understood that ownership of the data does not need to be coextensive with ownership of particular device, system, gateway, platform, network element, or the like. For example, the network owner data 108 may be utilized by the network gateway 114, but the owner of the network owner data 108 may not actually own the network gateway 114. Instead, the network gateway 114 may be owned by some other entity and only authorized to handle the network owner data 108, such as part of a lease agreement, service agreement, or the like. For ease of description, however, ownership of the network owner data 108 and the network gateway 114 will be described as coextensive, and similarly, ownership of the device owner data 110 and the device gateway 120, ownership of the party$_1$ owner data 112A and the party$_1$ gateway 124A, and ownership of the party$_N$ owner data 112N and the party$_N$ gateway 124N will each be described as coextensive. This should not be construed as being limiting in any way.

It also should be understood that the network gateway 114, the device gateway 120, the party$_1$ gateway 124A, the party$_N$ gateway 124N, the party$_1$ database 126A, and the party$_N$ database 126N may be described, at times, as being located in a "home" or "visited" location. These elements are labeled differently in the drawings using the "home" or "visited" descriptor in subscript. In the specification, these elements are labeled using the "home" or "visited" descriptor for the network gateway, the device gateway, and so on. The numerals remain the same throughout with the addition of a letter to further distinguish between "home" and "visited." For example, the network gateway 114 introduced in FIG. 1A is introduced as a home network gateway 114A in FIG. 1C and a visited network gateway 114B in FIG. 1D.

Figure 6:
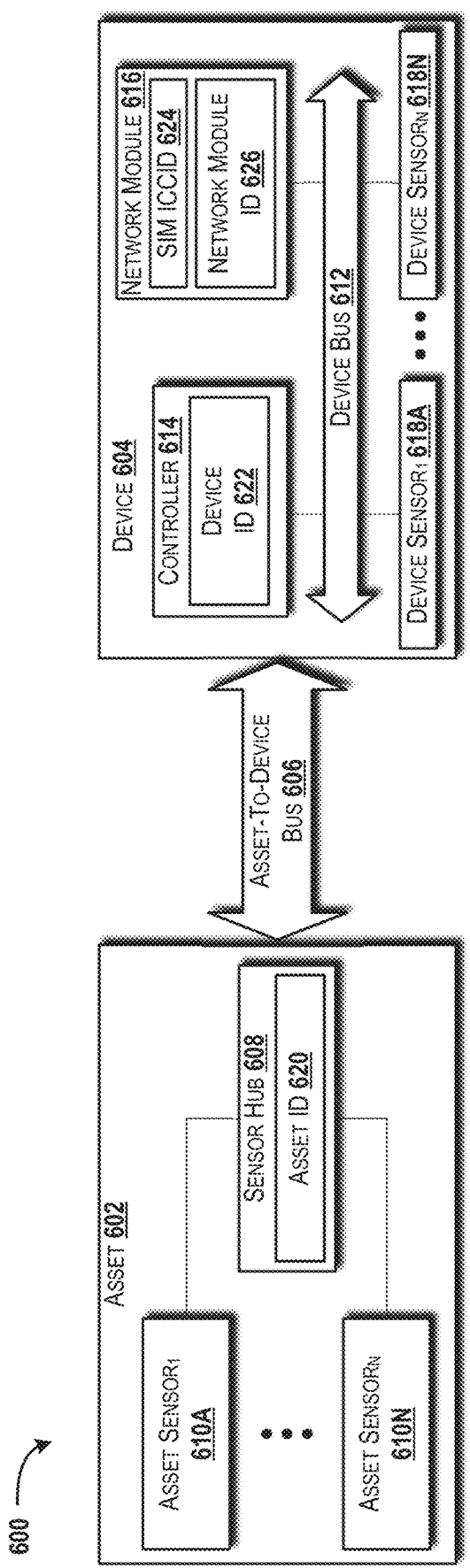
FIG. 6 is a block diagram illustrating aspects of an exemplary data source device implemented as a combination device that includes an asset and an IoT device, according to an illustrative embodiment.

The data source device 102 can be any type of device that is capable of generating and/or collecting data (e.g., from one or more sensors such as the sensors shown in FIG. 6). The data can be owned by a plurality of owners as described above. In some embodiments, the data source device 102 is or includes an IoT device, a non-limiting example of which is illustrated and described with reference to FIG. 6. The IoT device can be a non-programmable or programmable IoT device. In some embodiments, the data source device 102 is or includes a combination of an IoT device and an asset of some sort. An example of a combined IoT device and asset also is described with reference to FIG. 6. Details regarding policy-based programmable IoT devices are provided in U.S. patent application Ser. No. 16/663,431, filed Oct. 25, 2019, which is incorporated herein by reference in its entirety.

An asset can be an autonomous agent that meets the definition of a "machine" in accordance with machine-to-machine ("M2M") standards. As such, the asset can be a computing element with a network interface. The asset alternatively can be or can include, but is not limited to, a product or good, a box that contains one or more products/goods, a cargo box that contains one or more products/goods, a pallet that contains one or more cargo boxes, a container that contains at least one pallet, or any other storage and/or shipping configuration. The type of asset should not be limited in any way. Other assets can be associated with smart technologies, such as smart buildings, smart cities, smart health, smart manufacturing, smart factories, and the like, among other concepts associated with the fourth industrial revolution (also known as "Industry 4.0"). In some instances, an asset can be an individual or group of individuals. The type of asset should not be limited in any way. Moreover, the industries to which the concepts and technologies disclosed herein may be applied should not be limited in any way.

The data source device 102 can generate data for each party/data owner as the separate data segments 106A-106N. The data source device 102 can then perform a process to generate a hash of each of the data segments 106B-106N. Additional details about hash generation can be found in U.S. patent application Ser. No. 16/722,586, referenced above. Briefly, the data source device 102 can create separate hashes for the device owner data 110, the party$_1$ owner data 112A, and the party$_N$ owner data 112N. The data source device 102 also can create a hash of all data segments 106A-106N. The data source device 102 can generate these hashes using any hash function, including cyclic redundancy checks ("CRC") (e.g., CRC32), checksum functions, and cryptographic hash functions. After the data source device 102 generates the hashes, the data source device 102 can encrypt the data segments 106A-106N. The data source device 102 also can create a message footer (not shown) that includes a combination of the hashes.

The data source device 102 can then assemble the data message 104. The data segment$_1$ 106A can be or can include a message header to be used by the network gateway 114 for routing the data message 104, for example, to the network gateway 114, which can decrypt the network owner data 108 (e.g., routing data) using its own decryption key. The other parties can use their respective gateways 120, 124A, 124N to generate a new header to route the data message 104 to the next stop in the message flow sequence. The data source device 102 can add a message footer to the data message 104 to complete the message assembly process. Additional details about the message assembly process can be found in the U.S. patent application Ser. No. 16/722,586, referenced above.

After the data message 104 is assembled, the data source device 102 can route the data message 104 to the network gateway 114. The network gateway 114 is the only entity along the data message flow that is allowed to intercept the data message 104 before the device owner (via the device gateway 120). In some embodiments, the network gateway 114 is a federation platform with each of the other gateways—for example, the device gateway 120, the party$_1$ gateway 124A, and the party$_N$ gateway 124N—operating as enterprise edge platforms ("EEP") individually owned by a different enterprise. The EEPs provide a hosted, enterprise-specific data exchange that functions as a bridge between a public blockchain and a private pegged side chain, implemented.

Each of the gateways 114, 120, 124A, 124N can receive the data message 104 in sequence of a data message flow, consume the routing header (e.g., the network owner data 108 for the network gateway 114, and a new routing header for each additional participating gateway in the sequence), use the respective decryption keys to decrypt the respective data segments 106A-106N, and generate a hash (e.g., CRC32 or other described above) of the respective decrypted version of the data segments 106A-106N. Each gateway 114, 120, 124A, 124N can then acknowledge the data message 104 (e.g., via an ACK message), and can include the newly-generated hash in the ACK message. If a downstream party acknowledges the data message 104 with a hash, the data message 104 can be considered verified and can be passed to the next party upstream (e.g., the device gateway 120 to the party$_1$ gateway 124A, and so on in the sequence). The sequence can be determined by the device owner associated with the device gateway 120. In the illustrated example, the sequence of the network gateway 114 to the device gateway 120, the device gateway 120 to the party$_1$ gateway 124, and the party$_1$ gateway 124A to the part$_N$ gateway 124N should not be construed as being limiting in any way.

Figure 1B:
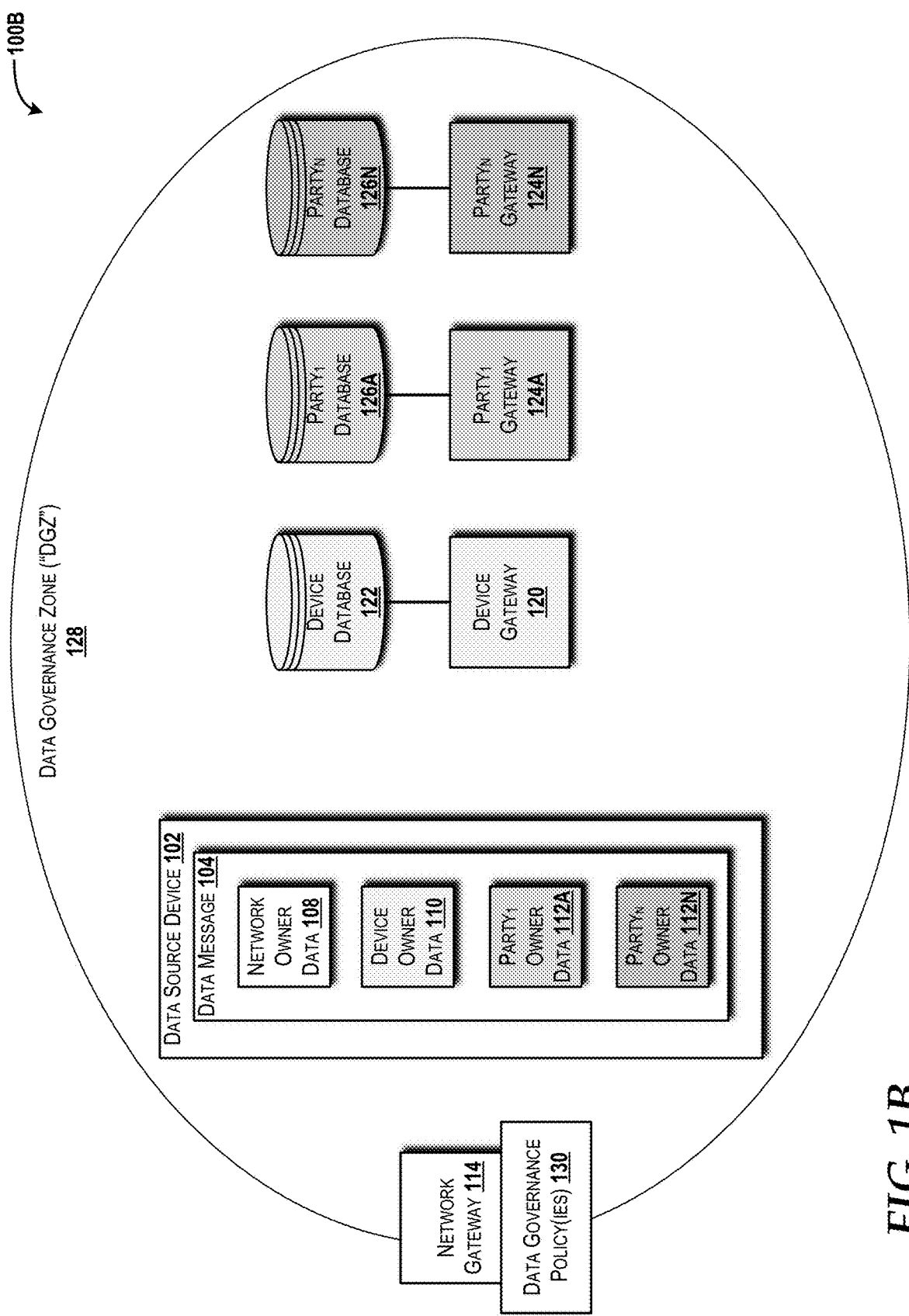

Turning first to FIG. 1B, an operating environment 100B is shown with the data source device 102 operating within a data governance zone ("DGZ") 128, according to an exemplary embodiment. The DGZ 128 is a geographically-bounded region defined in accordance with one or more data governance policies 130. The data governance policies 130 can be based upon laws, regulations, executive orders, and/or other directives established by government, enterprise, individual, regulatory committee, bureau, agency, multiples thereof, combinations thereof, and/or the like. The data governance policies 130 can define the geographical scope of the DGZ 128. In addition, the data governance policies 130 can define the data (e.g., in terms of data type, source, destination, and/or other criteria) that can be exchanged within the DGZ 128, such as from the data source device 102 to the device gateway 120, the party$_1$ gateway 124A, and/or the party$_N$ gateway 124N.

In general, the data governance policy 130 can define the DGZ 128 as a geographical area of any size and shape. The geographical area may be contiguous, such as between two countries across a shared border. The geographical area may be noncontiguous. For example, a company may operate in multiple countries that do not share a border (e.g., United States and China), and as such, the DGZ 128 may be defined as the area within the national borders of each country. Moreover, one data governance policy 130 may define the DGZ 128 as a contiguous portion of supply chain, such as across the shared border between China and Kazakhstan, and also a noncontiguous portion defined as the area within the borders of the United States.

The DGZ 128 can be local, regional, or global. In some embodiments, the DGZ 128 follows an existing border that separates geographical areas such as towns, cities, counties, states, provinces, or countries. Alternatively, the DGZ 128 can be established for specific buildings or other places (e.g., outdoor venues). Moreover, the DGZ 128 can be established for specific entities such as a business, government, or law enforcement entity. The DGZ 128 can apply to specific industries that consider the data governance policies 130 from a plurality of sources along a supply chain (e.g., from manufacturing to shipping and to deployment.)

The DGZ 128 can be defined based upon an existing infrastructure such as a telecommunications or a utility infrastructure. A mobile network is one non-limiting example of an existing infrastructure upon which the DGZ 128 can be defined. The mobile network can be operated, at least in part, by one or more mobile network operators ("MNOs"). The mobile network can utilize a number of cell-sites that can be uniquely identified by cell-IDs. These cell-IDs can be used to define the geographical area encompassed by the DGZ 128. This can be particularly useful for noncontiguous DGZs 128, although contiguous DGZs 128 may also benefit from such definitions. A high-level example of a mobile network is illustrated and described herein with reference to FIG. 8.

The DGZ 128 can implement the network gateway 114 as the gate-keeper/entry point to the DGZ 128. As mentioned above, the network gateway 114 can enforce one or more of the data governance policies 130 to ensure the exchange of data within the DGZ 128 is in compliance.

Figure 1C:
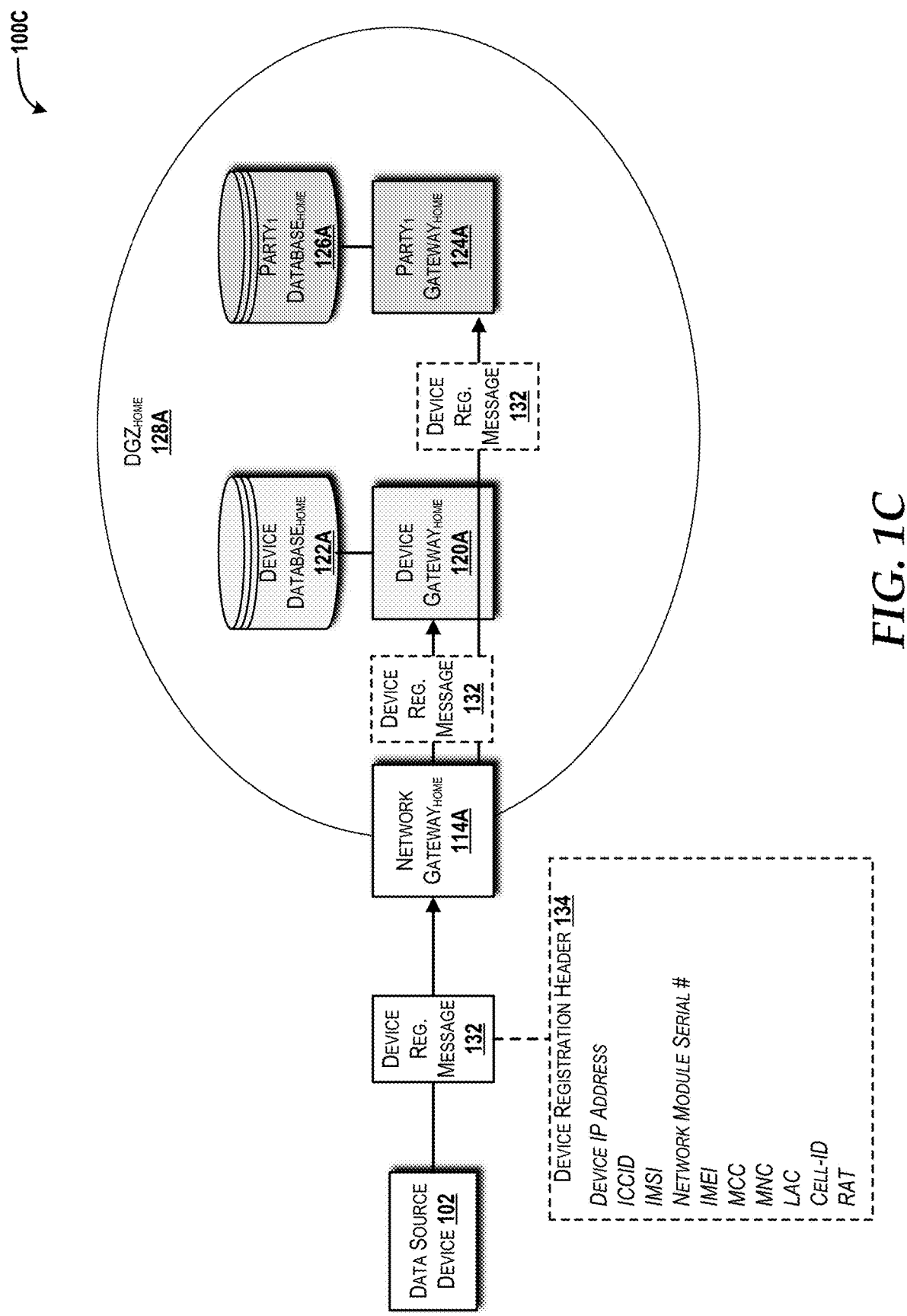

Turning now to FIG. 1C, an operating environment 100C is shown in a configuration to enable registration of the data source device 102 with a home network gateway 114A (illustrated as "network gateway$_{HOME}$") for access to a home DGZ 128A (illustrated as "DGZ$_{HOME}$"), according to an exemplary embodiment. The data source device 102 can generate a device registration message 132. The device registration message 132 can include a device registration header 134. The home network gateway 114A can utilize various data fields contained in the device registration header 134 to permit or deny access to the home DGZ 128A based upon compliance/non-compliance with one or more of the data governance policies 130.

The device registration header 134 can include a plurality of data fields. A data field can uniquely identify the data source device 102. For example, a data field can include a device IP address, an Integrated Circuit Card ID ("ICCID"), an International Mobile Subscriber Identity ("IMSI"), a network module serial number (see "network module" in FIG. 6), an International Mobile Equipment Identity ("IMEI"), or some combination thereof. A data field can uniquely identify a network location of the data source device 102. For example, a data field can include a location area code ("LAC"), a cell-ID, or a combination thereof. A data field can uniquely identify a network to which the data source device is connected. For example, a data field can include a mobile country code ("MCC"), a mobile network code ("MNC"), a radio access technology ("RAT"), or some combination thereof associated with a particular MNO. In some embodiments, the device registration header 134 can include standard information that is used for international roaming and clearing house functions between MNOs. In the illustrated example, the device registration header 134 includes a device IP address, an ICCID, an IMSI, a network module serial number, an IMEI, an MCC, an MNC, an LAC, a cell-ID, and a RAT (or multiple RATs). It should be understood that the device registration header 134 can include additional data fields or alternative fields as the case may be for particular MNOs and other entities, including proprietary data fields if desired.

The home network gateway 114A can receive the device registration message 132 and can extract data from the data fields to verify compliance with one or more of the data governance policies 130, such as a data governance policy 130 that permits or denies access to the home DGZ 128A based upon data contained in the device registration header 134. After successful verification, the home network gateway 114A can determine, based upon one or more additional data governance policies 130, one or more other gateways to which the device registration message 132 is to be forwarded. In the illustrated example, the home network gateway 114A determines that the device registration message 132 is to be forwarded to a home device gateway 120A (illustrated as "device gateway$_{HOME}$") and a home party$_1$ gateway 124A (illustrated as "party$_1$ gateway$_{HOME}$"). It should be understood that the home network gateway 114A may determine one or more additional third party gateways (e.g., up to party$_N$ gateway 124N; not shown in the illustrated example) to which to forward the device registration message 132. The home network gateway 114A can then forward the device registration message 132 to the other gateway(s) determined to be in compliance with the additional data governance policies 130, such as the home device gateway 120A and the home party$_1$ gateway 124A in the illustrated example.

Figure 1D:
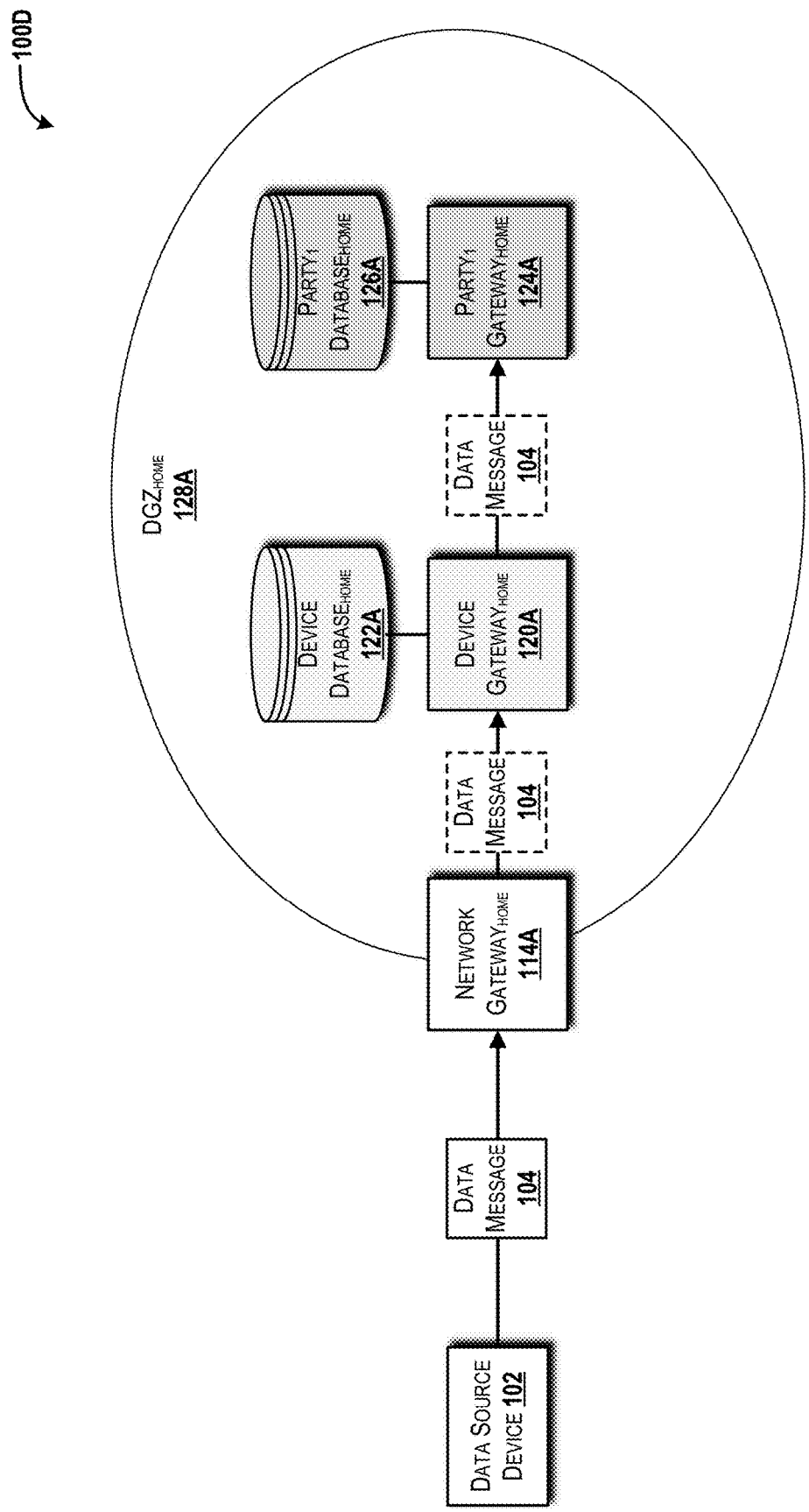

Turning now to FIG. 1D, an operating environment 100D is shown in a configuration to enable data message flow from the data source device 102 to the home network gateway 114A, the home device gateway 120A, and the home party$_1$ gateway 124A operating in the home DGZ 128A, according to an exemplary embodiment. The data source device 102 can encrypt data (such as data in the plurality of data segments 106A-106C) in the data message 104 and can send the data to the home network gateway 114A, which can serve as a proxy for the data to be distributed to the home device gateway 120A and the home party$_1$ gateway 124A. In some embodiments, the home device gateway 120A can serve as a proxy for the data to be distributed to third party gateways such as the home party$_1$ gateway 124A. The home device gateway 120A and the home party$_1$ gateway 124A can then process the data message 104. Additional details about how gateways can process the data message 104 are described in U.S. patent application Ser. No. 16/722,586.

Figure 1E:
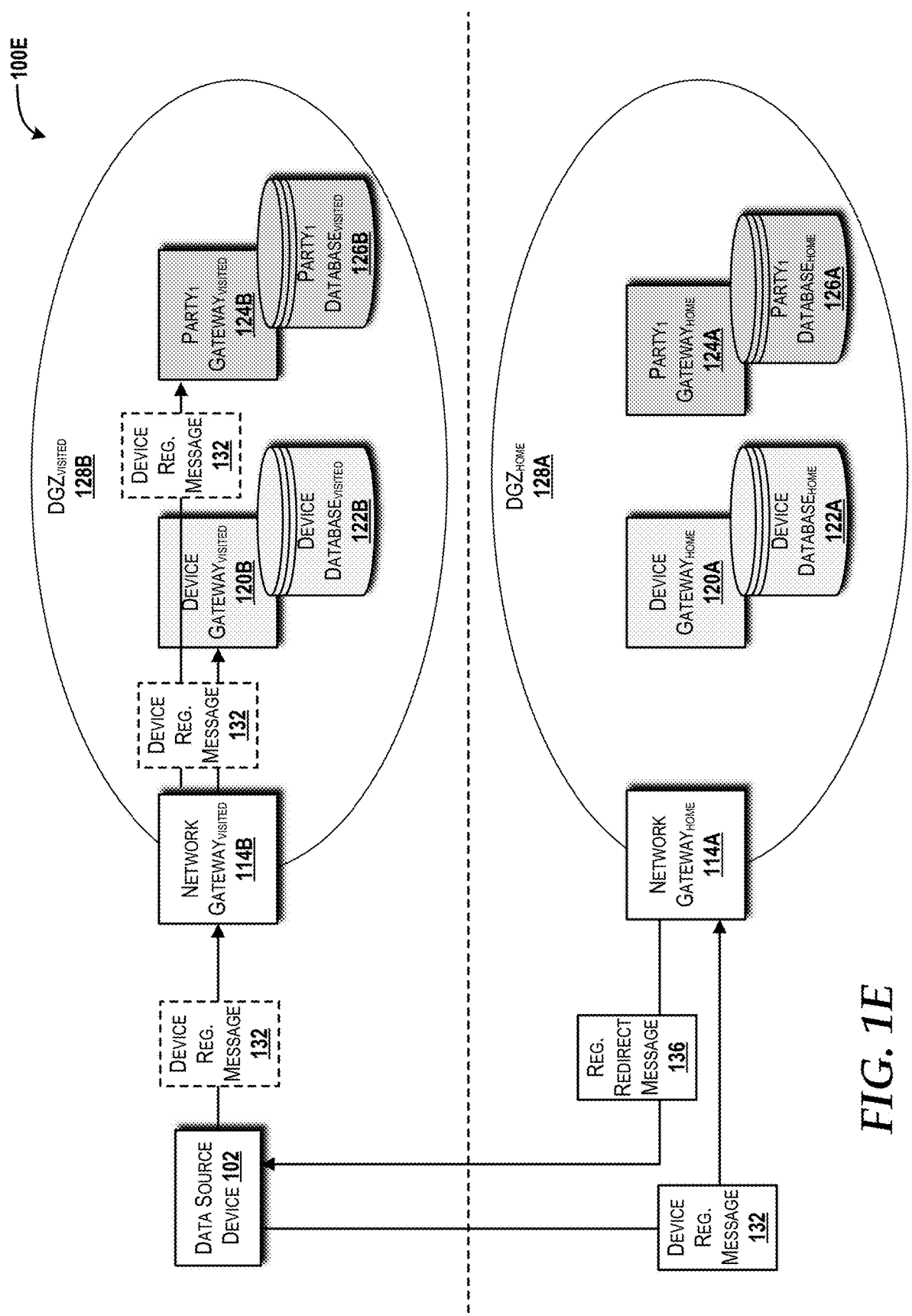

Turning now to FIG. 1E, the operating environment 100E is shown in a configuration to enable registration of the data source device 102 with a visited network gateway 114B (illustrated in FIG. 1E as "network gateway$_{VISITED}$") for access to a visited DGZ 128B (illustrated in FIG. 1E as "DGZ$_{VISITED}$"), according to an exemplary embodiment. The operating environment 100E includes the home DGZ 128A introduced in FIG. 1C and another DGZ (i.e., the visited DGZ 128B) with which the data source device 102 is attempting to register. The data source device 102 first attempts to register with a last known successful network gateway (i.e., the home DGZ 128A in this example). In particular, the data source device 102 can generate the device registration message 132 that includes the device registration header 134 (best shown in FIG. 1C) and can send the device registration message 132 to the home network gateway 114A. The home network gateway 114A can use the data fields in the device registration header 134 to verify one or more of the data governance policies, such as a data governance policy that permits or denies access to the home DGZ 128A.

In the illustrated example, the home network gateway 114A determines that the data source device 102 is no longer located in an area or otherwise unable to be served by the home network gateway 114A, such as if the visited network gateway 114B is associated with a different MNO. The home network gateway 114A can make this determination based upon information contained in the device registration header 134, such as the MCC, MNC, LAC, and/or cell-ID. The home network gateway 114A can then generate a registration redirect message 136 to inform the data source device 102 of the network gateway to which the device registration message 132 should be redirected. In the example shown in FIG. 1E, the registration redirect message 136 identifies the visited network gateway 114B associated with the visited DGZ 128B. The data source device 102 can receive the registration redirect message 136 from the home network gateway 114A and can forward the device registration message 132 on to the visited network gateway 114B.

The visited network gateway 114B can receive the device registration message 132 from the data source device 102 and can extract data from the data fields of the device registration header 134 to verify one or more of the data governance policies 130, such as a data governance policy that permits or denies access to the visited DGZ 128B. After successful verification, the visited network gateway 114B can determine, based upon one or more data governance policies 130, one or more other gateways to which the device registration message 132 is to be forwarded. In the illustrated example, the visited network gateway 114B determines that the device registration message 132 is to be forwarded to a visited device gateway 120B (illustrated as "device gateway$_{VISITED}$") and a visited party$_1$ gateway 124B (illustrated as "party$_1$ gateway$_{VISITED}$"). It should be understood that the visited network gateway 114B may determine one or more additional third party gateways (e.g., up to visited party$_N$ gateway 124N; not shown in the illustrated example) to which to forward the device registration message 132. The visited network gateway 114B can then forward the device registration message 132 to the other gateway(s), such as the visited device gateway 120B and the visited party$_1$ gateway 124B in the illustrated example.

Figure 1F:
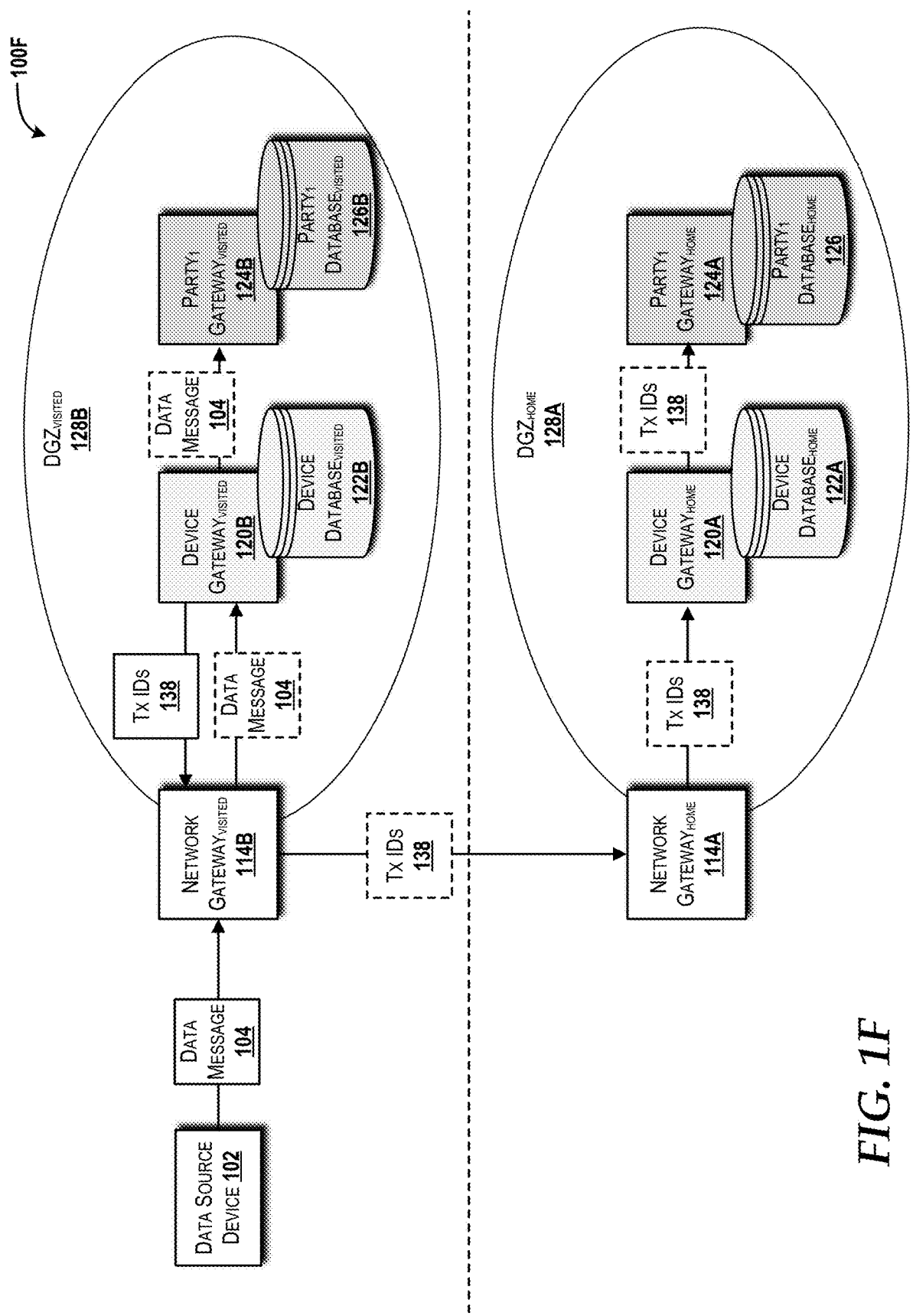

Turning now to FIG. 1F, an operating environment 100F is shown in a configuration to enable data message flow from the data source device 102 to the visited device gateway 120B and the visited party₁ gateway 124B operating in the visited DGZ 128B, according to an illustrative embodiment. The data source device 102 can encrypt data (such as data in the plurality of data segments 106A-106C) in the data message 104 and can send the data to the visited network gateway 114B, which can serve as a proxy to distribute the data to the visited device gateway 120B and the visited party₁ gateway 124B. In some embodiments, the visited device gateway 120B can serve as a proxy to distribute the data to the third party gateways such as the visited party₁ gateway 124B. The visited device gateway 120B and the visited party₁ gateway 124B can then process the data message 104.

The visited device gateway 120B can send one or more data message transaction identifiers ("TX-IDs") 138 associated with the data message 104 (e.g., one TX-ID for each version of the data message 104 distributed to the various gateways) to the visited network gateway 114B. For example, the visited network gateway 114B can send the data message 104 to the visited device gateway 120B that, in turn, can remove the device owner data 110 and forward the data message 104 to the visited party₁ gateway 124B that can remove the party₁ owner data 112A, and so on. Each version of the data message 104 can be associated with a unique TX-ID 138. The visited device gateway 120B can send the TX-ID(s) 138 associated with each version of the data message 104 to the visited network gateway 114B. The visited network gateway 114B can send the TX-ID(s) 138 to the home network gateway 114A. The home network gateway 114A can serve as a proxy to distribute the TX-ID(s) 138 to the other gateway(s). For example, the home network gateway 114A can serve as a proxy to distribute the appropriate TX-IDs 138 to the home device gateway 120A and the home party₁ gateway 124A. The home device gateway 120A can serve as a proxy to distribute the TX-ID(s) 138 to the home party₁ gateway 124A. It should be understood that only the TX-ID(s) 138 are exchanged between the visited DGZ 128B and the home DGZ 128A (and possibly other DGZs not shown), not the raw data (e.g., the network owner data 108, the device owner data 110, and the party₁ owner data 112A) contained in the data message 104.

Figure 2:
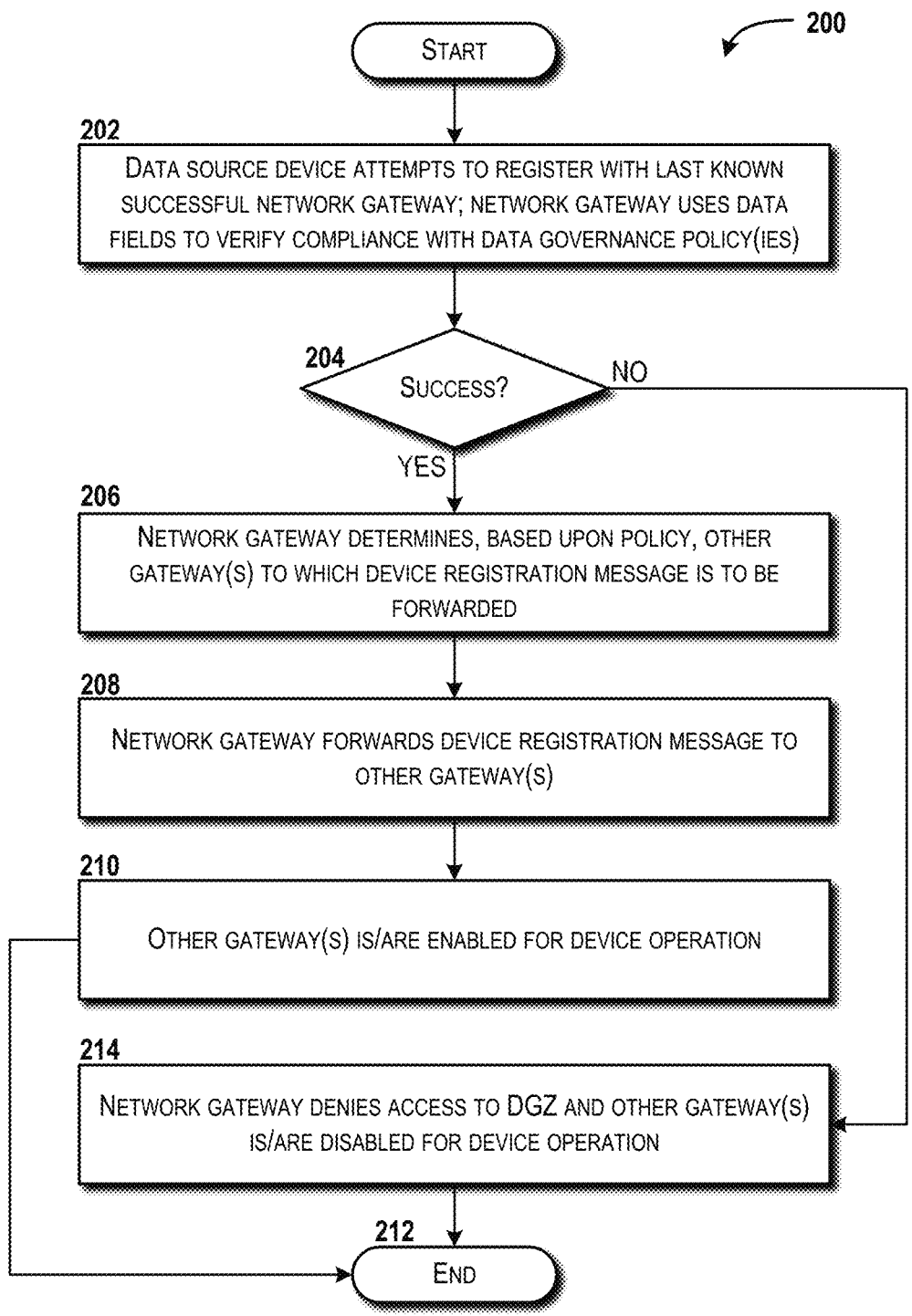
FIG. 2 is a flow diagram illustrating aspects of a method for registering a data source device with a home data governance zone ("DGZ"), according to an illustrative embodiment.

Turning now to FIG. 2, a method 200 for registering the data source device 102 with the home DGZ 128A (illustrated as "DGZ$_{HOME}$") will be described, according to an illustrative embodiment. The method 200 will be described with reference to FIG. 2 and additional reference to FIG. 1C.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device to perform one or more operations, and/or causing the processor to direct other components of the computing system or device to perform one or more of the operations.

For purposes of illustrating and describing the concepts of the present disclosure, operations of the methods disclosed herein are described as being performed by the data source device 102, the network gateway 114 (home or visited), the device gateway 120 (home or visited), the party₁ gateway 124A (home or visited), and/or the party$_n$ gateway 124N (home or visited). It should be understood that additional and/or alternative devices, servers, computers, and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the data source device 102 attempts to register with a last known successful network gateway, which is the home network gateway 114A in the example shown in FIG. 1C. It should be understood that the last known successful network gateway does not need to be the home network gateway 114A, and instead may be a visited network gateway 114B such as shown in FIG. 1E. The data source device 102 can generate the device registration message 132 that includes the device registration header 134 (best shown in FIG. 1C) and can send the device registration message 132 to the home network gateway 114A. The home network gateway 114A can use one or more of the data fields in the device registration header 134 to verify compliance with one or more of the data governance policies 130, such as a data governance policy that permits or denies access to the home DGZ 128A. From operation 202, the method 200 proceeds to operation 204. At operation 204, the home network gateway 114A determines if verification of compliance with the data governance policy 130 was successful. If so, the method 200 proceeds from operation 204 to operation 206.

At operation 206, the home network gateway 114A determines, based upon one or more data governance policies, the other gateway(s) to which the device registration message 132 is to be forwarded. In the example shown in FIG. 1C, the home network gateway 114A determines that the device registration message 132 is to be forwarded to the home device gateway 120A and the home party₁ gateway 124A. It should be understood that the home network gateway 114A may determine one or more additional third party gateways (e.g., up to a home party$_N$ gateway 124N) to which to the device registration message 132 is to be forwarded. From operation 206, the method 200 proceeds to operation 208. At operation 208, the home network gateway 114A forwards the device registration message 132 to the other gateway(s) determined at operation 206.

From operation 208, the method 200 proceeds to operation 210. At operation 210, the home network gateway 114A forwards the device registration message 132 to the other gateway(s). In the example shown in FIG. 1C, the home network gateway 114A forwards the device registration message 132 to the home device gateway 120A and the home party$_1$ gateway 114A. From operation 208, the method 200 proceeds to operation 210. At operation 210, the other gateway(s) is/are enabled for device operation. In other words, the other gateway(s) can receive one or more data messages 104 and process the appropriate data. For example, the home device gateway 120A can receive the device owner data 110 and the party$_1$ gateway 124A can receive the party$_1$ owner data 112A via the data message 104. From operation 210, the method 200 proceeds to operation 212. The method 200 can end at operation 212.

Returning to operation 204, if the home network gateway 114A determines that verification of the data governance policy 130 was unsuccessful, the method 200 proceeds to operation 214. At operation 214, the home network gateway 114A denies access to the home DGZ 128 and the other gateway(s) is/are disabled for device operation. In other words, the other gateway(s) cannot receive any data messages 104 from the data source device 102. From operation 210, the method 200 proceeds to operation 212. The method 200 can end at operation 212.

Figure 3:
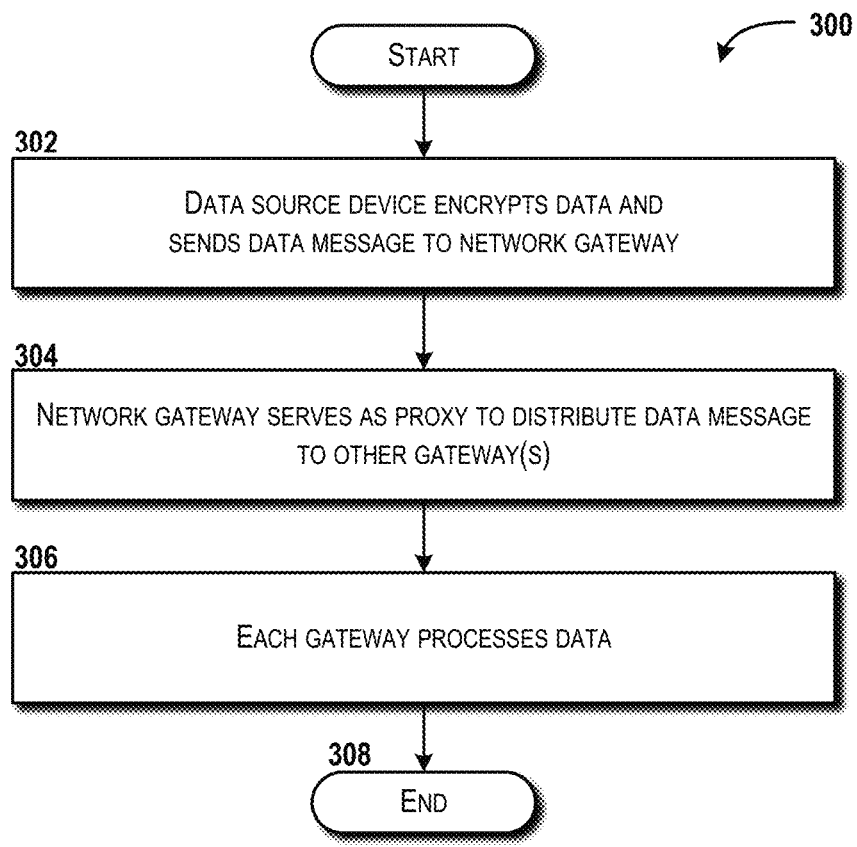
FIG. 3 is a flow diagram illustrating aspects of a method for handling a data message flow within a home DGZ, according to an illustrative embodiment.

Turning now to FIG. 3, a flow diagram illustrating aspects of a method 300 for handling a data message 104 flow within the home DGZ 128A will be described, according to an illustrative embodiment. The method 300 will be described with reference to FIG. 3 and additional reference to FIG. 1D.

The method 300 begins and proceeds to operation 302. At operation 302, the data source device 102 encrypts data in the data message 104 and sends the data message 104 to the home network gateway 114A. It should be understood that the home network gateway 114A can only access the network owner data 108 and does not have access to monitor the device owner data 110, the party$_1$ owner data 112A, and/or the party$_N$ owner data 112N.

From operation 302, the method 300 proceeds to operation 304. At operation 304, the home network gateway 114 serves as a proxy to distribute the data message 104 to the other gateway(s). In some embodiments, the home device gateway 120A can serve as a proxy to distribute the data message 104 to one or more third party gateways such as the home party$_1$ gateway 124A shown in FIG. 1D.

From operation 304, the method 300 proceeds to operation 306. At operation 306, each of the other gateway(s) processes respective data. For example, the home device gateway 120A can process the device owner data 110 and the home party$_1$ gateway 124A can process the party$_1$ owner data 112A. Additional details in this regard are described in U.S. patent application Ser. No. 16/722,586. From operation 306, the method 300 proceeds to operation 308. The method 300 can end at operation 308.

Figure 4:
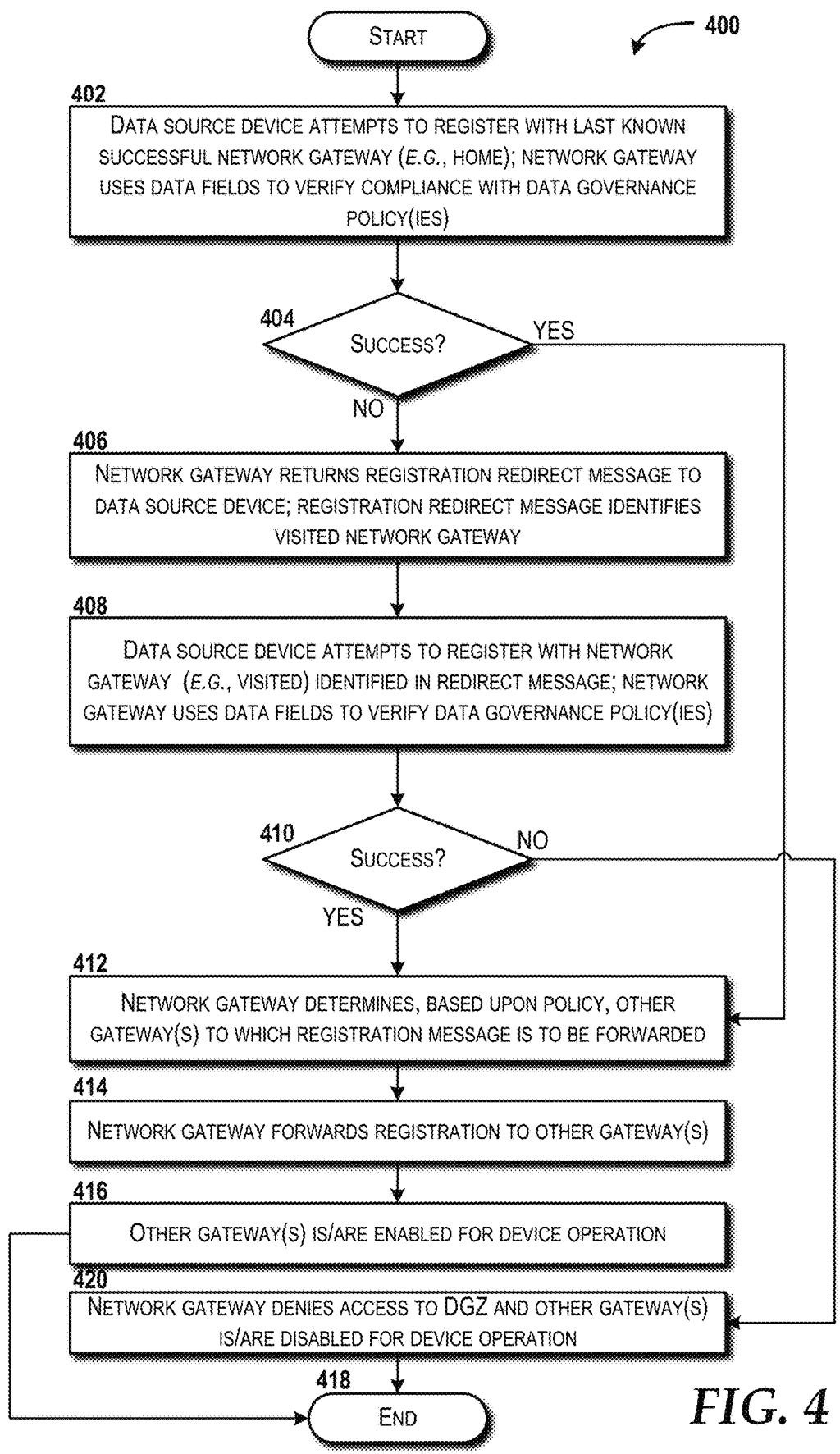
FIG. 4 is a flow diagram illustrating aspects of a method for registering a data source device with a visited DGZ, according to an illustrative embodiment.

Turning now to FIG. 4, a flow diagram illustrating aspects of a method 400 for registering the data source device 102 with the visited DGZ 128B (illustrated in FIG. 1E as "DGZ$_{VISITED}$") will be described, according to an illustrative embodiment. The method 400 will be described with reference to FIG. 4 and additional reference to FIG. 1E.

The method 400 begins and proceeds to operation 402. At operation 402, the data source device 102 attempts to register with the last known successful network gateway (e.g., the home DGZ 128A). In particular, the data source device 102 can generate the device registration message 132 that includes the device registration header 134 (best shown in FIG. 1C) and can send the device registration message 132 to the home network gateway 114A (illustrated in FIG. 1E as "network gateway$_{HOMe}$"). The home network gateway 114A uses the data fields in the device registration header 134 to verify compliance with one or more of the data governance policies 130, such as a data governance policy that permits or denies access to the home DGZ 128A based upon information contained in the device registration header 134. From operation 402, the method 400 proceeds to operation 404. At operation 404, the home network gateway 114A determines if verification of compliance with the data governance policy 130 was successful. If not, the method 400 proceeds from operation 404 to operation 406.

At operation 406, the home network gateway 114A returns the registration redirect message 136 to the data source device 102. The registration redirect message 136 identifies the network gateway 114 to which the device registration message 132 should be redirected. In the example shown in FIG. 1E, the registration redirect message 136 identifies the visited network gateway 114B associated with the visited DGZ 128B (illustrated in FIG. 1E as "DGZ$_{VISITED}$").

From operation 406, the method 400 proceeds to operation 408. At operation 408, the data source device 102 attempts to register with the visited network gateway 114B identified in the registration redirect message 136. In particular, the data source device 102 forwards the device registration message 132 to the visited network gateway 114B. The visited network gateway 114B uses the data fields in the device registration header 134 to verify compliance with one or more of the data governance policies 130, such as a data governance policy 130 that permits or denies access to the visited DGZ 128B. From operation 408, the method 400 proceeds to operation 410. At operation 410, the visited network gateway 114B determines if verification of compliance with the data governance policy 130 was successful. If so, the method 400 proceeds to operation 412.

At operation 412, the visited network gateway 114B determines, based upon one or more of the data governance policies, the other gateway(s) to which the device registration message 132 is to be forwarded. In the example shown in FIG. 1E, the visited network gateway 114B determines that the device registration message 132 is to be forwarded to the visited device gateway 120B (illustrated in FIG. 1E as "device gateway$_{VISITED}$") and the visited party$_1$ gateway 124B (illustrated in FIG. 1E as "party$_1$ gateway$_{VISITED}$"). It should be understood that the visited network gateway 114B may determine one or more additional third party gateways (e.g., up to party$_N$ gateway 124N) to which to forward the device registration message 132. From operation 412, the method 400 proceeds to operation 414.

At operation 414, the visited network gateway 114B forwards the device registration message 132 to the other gateway(s) determined at operation 412. In the example shown in FIG. 1E, the visited network gateway 114B forwards the device registration message 132 to the visited device gateway 120B and the visited party$_1$ gateway 124B. From operation 414, the method 400 proceeds to operation 416. At operation 416, the other gateway(s) is/are enabled for device operation. In other words, the other gateway(s) can receive one or more data messages 104 from the data source device 102. For example, the visited device gateway 120B can receive the device owner data 110 and the visited party$_1$ gateway 124B can receive the party$_1$ owner data 112A via the data message 104. From operation 416, the method 400 proceeds to operation 418. The method 400 can end at operation 418.

Returning to operation 410, if the visited network gateway 114B determines that verification of compliance with the data governance policy 130 was unsuccessful, the method 400 proceeds to operation 420. At operation 420, the visited network gateway 114B denies access to the visited DGZ 128B and the other gateway(s) is/are disabled for device operation. In other words, the other gateway(s) cannot receive any data messages 104 from the data source device 102. From operation 420, the method 400 proceeds to operation 418. The method 400 can end at operation 418.

Returning to operation 404, if the home network gateway 114A determines that verification of the data governance policy 130 was successful, the method 400 proceeds from operation 404 to operation 412. At operation 412, the home network gateway 114A determines, based upon one or more of the data governance policies 130, the other gateway(s) to which the device registration message 132 is to be forwarded. From operation 412, the method 400 proceeds to operation 414. At operation 414, the home network gateway 114A forwards the device registration message 132 to the other gateway(s) determined at operation 412.

From operation 414, the method 400 proceeds to operation 416. At operation 416, the other gateway(s) is/are enabled for device operation. In other words, the other gateway(s) can receive data from the data source device. For example, the home device gateway 120A can receive the device owner data 110 and the home party$_1$ gateway 124A can receive the party$_1$ owner data 112A via the data message 104. From operation 416, the method 400 proceeds to operation 418. The method 400 can end at operation 418.

Figure 5:
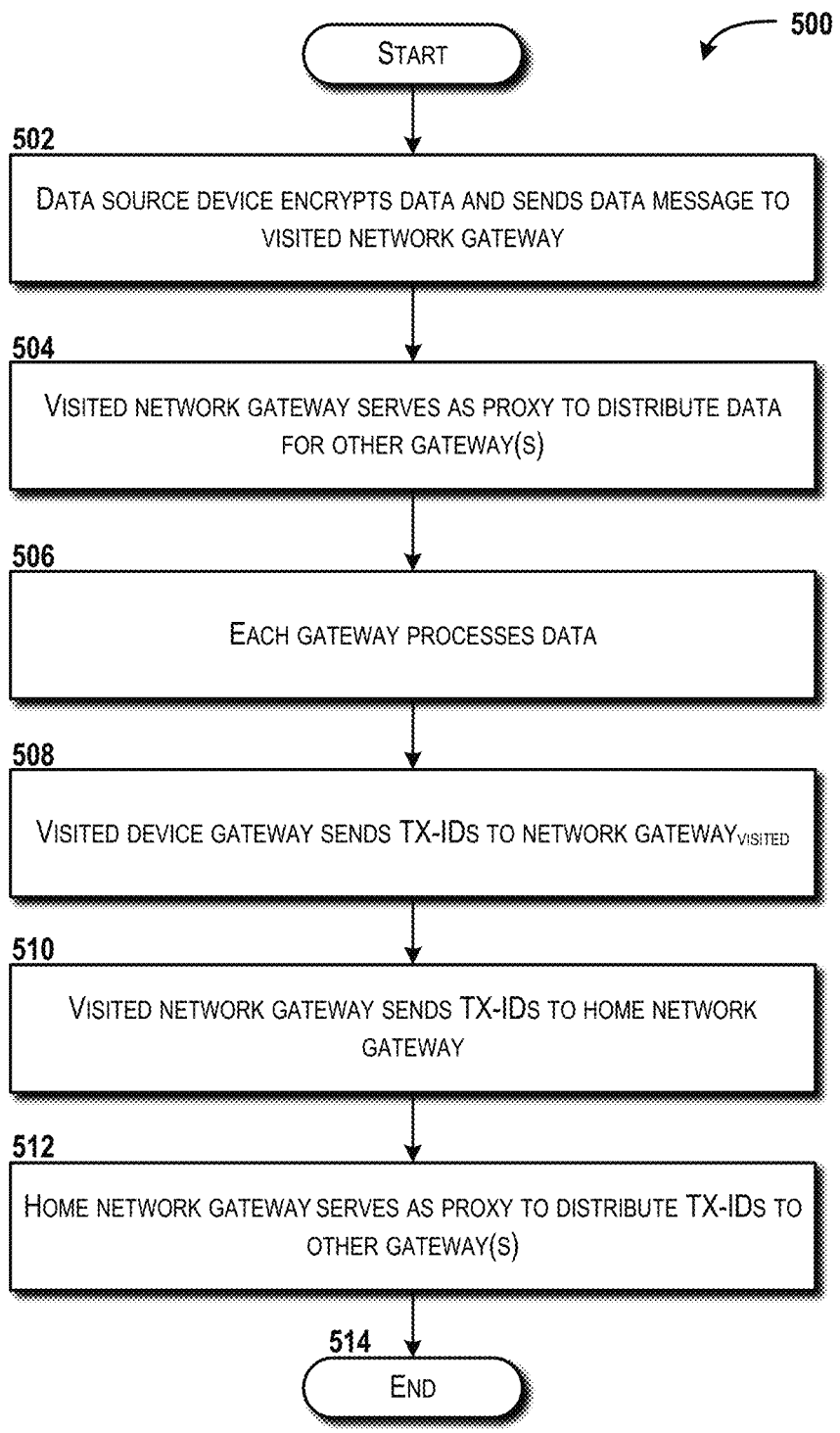
FIG. 5 is a flow diagram illustrating aspects of a method for handling a data message flow within a visited DGZ, according to an illustrative embodiment.

Turning now to FIG. 5, a flow diagram illustrating aspects of a method 500 for handling a data message 104 flow within the visited DGZ 128B will be described, according to an illustrative embodiment. The method 500 will be described with reference to FIG. 5 and additional reference to FIG. 1F.

The method 500 begins and proceeds to operation 502. At operation 502, the data source device 102 encrypts data in the data message 104 and sends the data message 104 to the visited network gateway 114B. It should be understood that the visited network gateway 114B can only access the network owner data 108 and does not have access to monitor the device owner data 110, the party$_1$ owner data 112, and/or the party$_N$ owner data 112N.

From operation 502, the method 500 proceeds to operation 504. At operation 504, the visited network gateway 114B serves as a proxy to distribute the data for the other gateway(s). In some embodiments, the visited device gateway 120B serves as a proxy to distribute the data message 104 to the visited third party gateways such as the visited party$_1$ gateway 124B shown in FIG. 1F.

From operation 504, the method 500 proceeds to operation 506. At operation 506, each of the other gateway(s) processes respective data. For example, the visited device gateway 120B processes the device owner data 110 and the visited party$_1$ gateway 124B processes the party$_1$ owner data 112A. Additional details in this regard are described in U.S. patent application Ser. No. 16/722,586.

From operation 506, the method 500 proceeds to operation 508. At operation 508, the visited device gateway 120B sends the TX-ID(s) 138 associated with the data messages 104 to the visited network gateway 114B. In some embodiments, a single TX-ID 138 per data message 104 is shared across all data owners. In some other embodiments, each of the data segments 106A-106N is associated with a unique TX-ID 138. In these embodiments, the gateways can provide the TX-ID(s) 138 to the relative owners (e.g., a TX-ID 138 associated with part$_1$ in the visited DGZ 128B goes to party$_1$ in the home DGZ 128B). For example, the visited network gateway 114B can send the data message 104 to the visited device gateway 120B that, in turn, can remove the device owner data 110 and forward the data message 104 to the visited party$_1$ gateway 124B that can remove the party$_1$ owner data 112A, and so on. Each version of the data message 104 can be associated with a unique TX-ID 138. The visited device gateway 120B can send the TX-ID(s) 138 associated with each version of the data message 104 to the visited network gateway 114B.

From operation 508, the method 500 proceeds to operation 510. At operation 510, the visited device gateway 120B sends the TX-IDs 138 to the home network gateway 114A. From operation 510, the method 500 proceeds to operation 512. At operation 512, the home network gateway 114A serves as a proxy to distribute the TX-IDs 138 to the other gateway(s). For example, the home network gateway 114A can serve as a proxy to distribute the TX-IDs 138 for the home device gateway 120A and the home party$_1$ gateway 124A. The home device gateway 120A can serve as a proxy to distribute the TX-ID(s) 138 to the home party$_N$ gateway 124A. It should be understood that only the Tx-IDs 138 are exchanged between the visited DGZ 128B and the home DGZ 128A (and possibly other DGZs not shown), not the raw data contained in the data message 104. From operation 512, the method 500 proceeds to operation 514. The method 500 can end at operation 514.

Turning now to FIG. 6, a block diagram illustrating aspects of a combination data source device 600 that combines an asset 602 and a device 604 (e.g., an IoT device) will be described, according to an illustrative embodiment. The asset 602 can be any "thing" that is to be tracked and/or monitored. The asset 602 is flexible and can support n-number of sensor combinations to monitor one or more parameters associated with the asset 602. The asset 602 is in communication with a programmable IoT device (referred to herein for simplicity as the "device") 604 via an asset-to-device bus 606. The embodiments described herein focus on a single device 604. The device 604 is flexible and can support n-number of sensor combinations to monitor one or more parameters associated with the asset 602. The parameter(s) to be monitored can be any parameter of the asset 602 and/or the device 604 that is/are capable of being monitored by one or more sensors. The sensors can be off-the-shelf sensors or custom sensors built to monitor a specific one or more parameters associated with the asset 602. As such, the concepts and technologies disclosed herein are not limited to any particular set of parameters to be monitored. By way of example, however, the parameters can be environmental parameters such as temperature or humidity of the asset 602; security parameters such as when a door open/closes; or geographical/location parameters such as latitude and longitude coordinates.

The asset-to-device bus 606 can enable bi-directional communication between the asset 602 and the device 604. More particularly, the device 604 can communicate with a sensor hub 608 of the asset 602 to obtain sensor data from any number of asset sensors 610A-610N (hereinafter referred to individually as "asset sensor 610," or collectively as "asset sensors 610"). Additional details are provided in U.S. patent application Ser. No. 16/663,431, filed Oct. 25, 2019, which is incorporated herein by reference in its entirety. The asset sensors 610 can be associated with the asset 602 (e.g., installed, attached, or otherwise implemented) so as to monitor different aspects of the asset 602. The asset sensor(s) 610, in some embodiments, is/are associated with the asset 602 as the asset 602 moves through a supply chain, such as, for example, from manufacturing (or harvesting, mining, or other method of creation or procurement) to warehousing to fleet/shipping and finally to retail or another link in the supply chain. The supply chain may be populated by the various owners of the data collected by the asset 602 and/or the device 604 to be sent in the data message 104. In this manner, the asset sensors 610 can include sensors that monitor/track data that is common among the different verticals in the supply chain. For example, the asset sensors 610 may include a temperature sensor and/or humidity sensor configured to measure the temperature and/or humidity of the asset 602 itself or an environment in which the asset 602 is located.

The asset-to-device bus 606 can be or can include any interface over which data can be shared between the sensor hub 608 and the device 604. The asset-to-device bus 606, in some embodiments, also can provide power to the sensor hub 608 in sufficient capacity to enable operation of the asset sensors 610. Although a power supply is not illustrated, AC and DC power supplies are contemplated, including mains and battery-based implementations. The asset-to-device bus 606 can be implemented as a wired, wireless, or combined wired/wireless interface. The asset-to-device bus 606 can utilize any standardized interface such as, but no limited to, serial bus, universal serial bus ("USB"), serial ATA ("SATA"), eSATA, BLUETOOTH, IEEE 1394 ("FIREWIRE"), serial peripheral interface ("SPI"), inter-integrated circuit ("I2C"), WIFI, combinations thereof, and the like. The asset-to-device bus 606 alternatively can utilize a proprietary interface.

The asset-to-device bus 606 can be an extension of a device bus 612 associated with the device 604. The device bus 612 can enable communication between components of the device 604, including a controller 614, a network module 616, and any number of device sensors 618A-618N (hereinafter referred to individually as "device sensor 618," or collectively as "device sensors 618"), and with the sensor hub 608 that terminates the asset-to-device bus 606. This allows sensors external to the device 604, such as the asset sensors 610 connected to the sensor hub 608, to be viewed by the device 604, and more specifically, the controller 614 of the device 604, as internal sensors similar to the device sensors 618. In this manner, the device 604 can provide additional monitoring/tracking functionality to the asset 602. Moreover, as noted above, the asset sensors 610 can be powered by the device 604 similar to the device sensors 618 and other components of the device 604.

The sensor hub 608 is extensible so that n-number of sensors can be attached externally to the device 604. The sensor hub 608 can be associated with an electronic identifier (shown as "asset ID 620"). The asset ID 620 is a unique identifier to uniquely identify the asset 602 among a plurality of other assets (not shown). The format of the asset ID 620 can include any combination of letters, numbers, symbols, and/or other characters. The asset ID 620 can be or can include a serial number (or other identifier) associated with the asset 602. The asset ID 620 can be in a standardized format or a proprietary format.

The asset sensors 610 and the device sensors 618 can be any sensor types. By way of example, and not limitation, the asset sensors 610 and the device sensors 618 can be or can include acceleration sensors, acoustic sensors, advanced sensors, alkalinity sensors, ambient sensors, angle sensors, auditory sensors, automation sensors, automotive sensors, barometric sensors, bio sensors, chemical sensors, control sensors, density sensors, depth sensors, directional sensors, displacement sensors, distance sensors, door sensors, electric current sensors, electric potential sensors, flow sensors, fluid sensors, fluid velocity sensors, force sensors, gas sensors, glass sensors, global positioning system ("GPS") sensors, heat sensors, humidity sensors, imaging sensors, industrial sensors, infrared sensors, interface sensors, ionizing sensors, laser sensors, level sensors, light sensors, liquid sensors, magnetic sensors, manufacturing sensors, navigation sensors, optical sensors, pH Sensors, photon sensors, polar sensors, position sensors, pressure sensors, proximity sensors, radar sensors, radiation sensors, radio sensors, shock sensors, smoke sensors, sound sensors, speed sensors, temperature sensors, thermal sensors, ultrasonic sensors, velocity sensors, vibration sensors, yaw sensors, any combinations thereof, and the like. Some examples disclosed herein focus on sensor types such as temperature and humidity sensors. It should be understood that these examples are merely exemplary and should not be construed as being limiting in any way.

The controller 614 can control at least some of the functions of the device 604. The controller 614 can include one or more processors, which can be operatively linked and in communication with one or more memory components. The processor(s) can execute computer-executable instructions stored in the memory component(s). Execution of the computer-executable instructions can cause the controller 614 to perform various functions described herein. In some embodiments, the controller 614 is designed as an integrated circuit, such as a microcontroller, system-on-a-chip, or the like, that includes the processor(s), memory component(s), and input/output components (e.g., the asset-to-device bus 606 and/or the device bus 612). In some embodiments, the network module 616 can be implemented as part of the controller 614. Those skilled in the art will appreciate the numerous designs suitable for the device 604 to effectively provide the functionality described herein. Although components of the device 604 are shown separately in the illustrated embodiment, integration of two or more of these components is contemplated and may be beneficial for some implementations. As such, the illustrated example and other examples described herein for the design of the device 604 should not be construed as being limiting in any way.

The device 604 can be associated with a device ID 622. The device ID 622 can be a device serial number or other identifier that uniquely identifies the device 604. For example, the device ID 622 can be or can include data contained in the device registration header 134 (best shown in FIG. 1C). In the illustrated example, the device ID 622 is shown as being stored in the controller 614 (e.g., in a memory component thereof). The device ID 622 may be stored elsewhere such as, for example, a dedicated memory component that may provide additional security to avoid spoofing or other tampering with the device 604.

Figure 8:
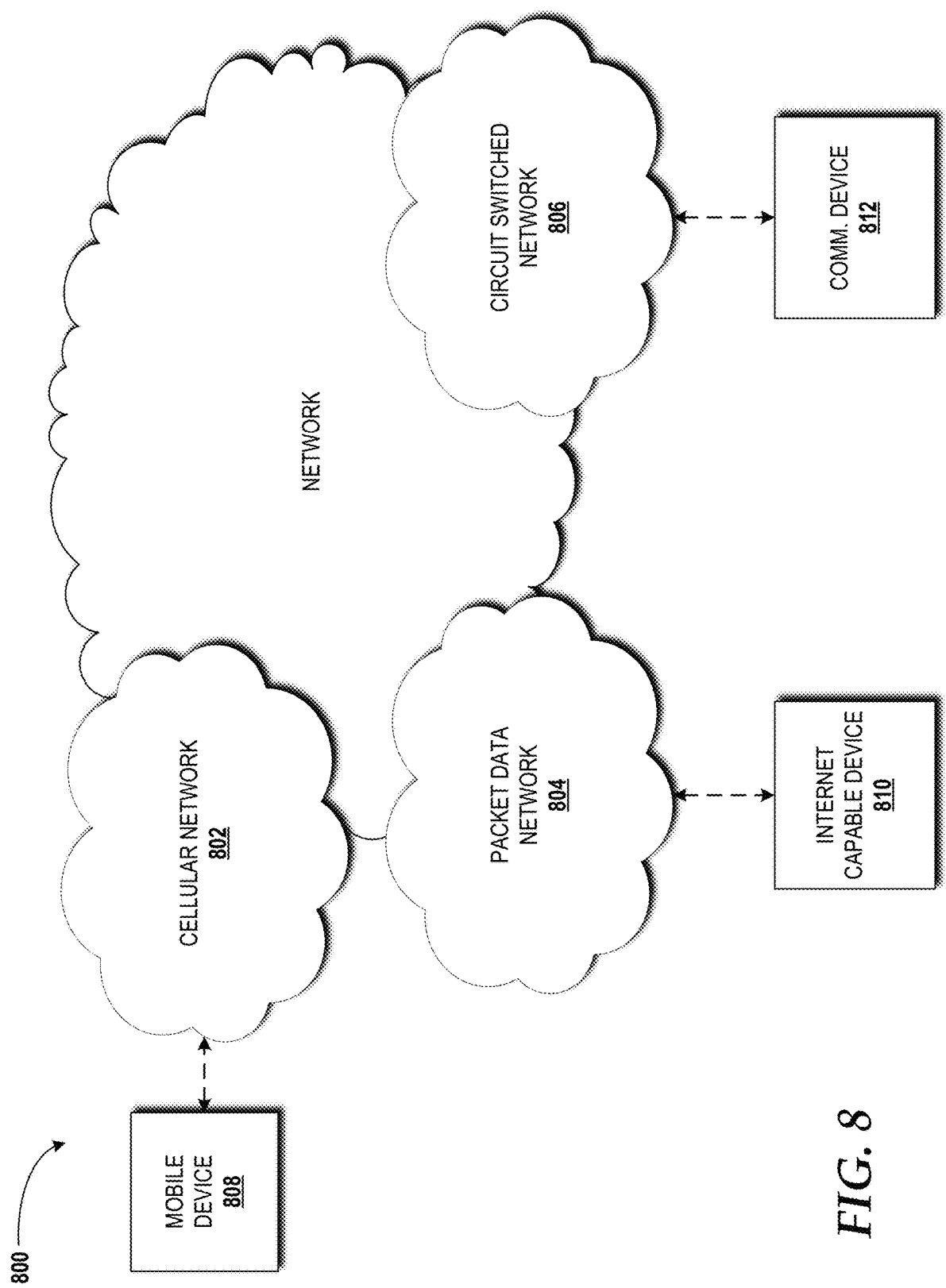
FIG. 8 is a block diagram illustrating a network that can be used to implement aspects of the concepts and technologies disclosed herein, according to an illustrative embodiment.

The network module 616 can be operatively linked and in communication with one or more communications networks (best shown in FIG. 8). The network module 616 can be or can include a wireless network interface. The network module 616 can be used to communicate with other devices and/or networks (not shown). In some embodiments, the network module 616 includes or is otherwise in communication with a subscriber identity module ("SIM") system (not shown). The SIM system can include a universal SIM ("USIM"), a universal integrated circuit card ("UICC"), and/or other identity devices that can be uniquely identified by a SIM ICCID 624. The SIM system can include and/or can be connected to or inserted into an interface such as a slot interface. In some embodiments, the interface can be configured to accept insertion of other identity cards or modules for accessing various types of networks. Additionally, or alternatively, the interface can be configured to accept multiple subscriber identity cards. The network module 616 can be associated with its own unique identifier shown as a network module ID 626 (e.g., a network module serial number as depicted in the device registration header 134 shown in FIG. 1C). Because other devices and/or modules for identifying users, owners, and/or the device 604 are contemplated, it should be understood that these embodiments are illustrative, and should not be construed as being limiting in any way.

Figure 7:
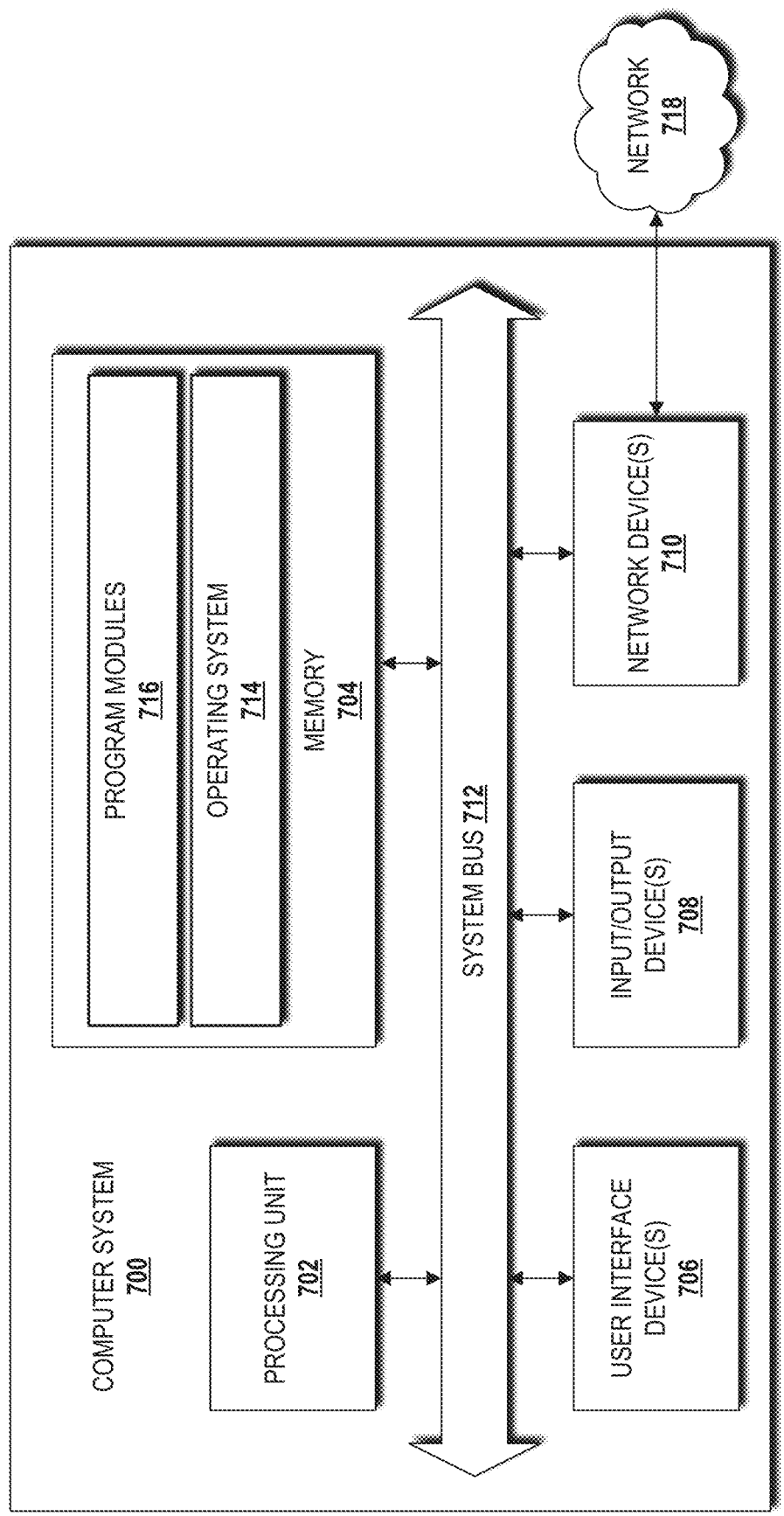
FIG. 7 is a block diagram illustrating an example computer system that can be used to implement aspects of the concepts and technologies disclosed herein, according to an illustrative embodiment.

Turning now to FIG. 7, a block diagram illustrating a computer system 700 configured to provide the functionality described herein in accordance with various embodiments of the concepts and technologies disclosed herein. In some embodiments, the data source device 102, the network gateway 114, the device gateway 120, the party$_1$ gateway 124A, and/or the party$_n$ gateway 124N can be configured like and/or can have an architecture similar or identical to the computer system 700 described herein with respect to FIG. 7. It should be understood, however, that any of these systems, devices, or elements may or may not include the functionality described herein with reference to FIG. 7.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium," "computer-readable storage medium," and variations thereof does not include waves or signals per se and/or communication media, and therefore should be construed as being directed to "non-transitory" media only.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer to output data.

The network devices 710 enable the computer system 700 to communicate with other networks or remote systems via one or more networks, such as a network 718. Examples of the network devices 710 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network(s) may be a wired network such as, but not limited to, a WAN such as the Internet, a LAN, a wired PAN, or a wired MAN.

Turning now to FIG. 8, a network 800 is illustrated, according to an illustrative embodiment. Communications among the data source device 102, the network gateway 114, the device gateway 120, the party$_1$ gateway 124A, and the party$_n$ gateway 124N can be handled over the network 800, and in particular, a cellular network 802 (e.g., mobile network), a packet data network 804, for example, the Internet, and a circuit switched network 806, for example, a publicly switched telephone network ("PSTN"). The cellular network 802 includes various components such as, but not limited to, base transceiver stations ("BTSs"), Node-B's, e-Node-B's, g-Node-B's base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, the data source device 102, the network gateway 114, the device gateway 120, the party$_1$ gateway 124A, and/or the party$_N$ gateway 124N, a cellular telephone, a user equipment, a mobile terminal, a PDA, a laptop computer, a handheld computer, and combinations thereof, can be operatively connected to the cellular network 802. The mobile communications device 808 can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards as well as evolved and future mobile standards.

The packet data network 804 includes various devices, for example, the data source device 102, the network gateway 114, the device gateway 120, the party$_1$ gateway 124A, and/or the party$_n$ gateway 124N, servers, computers, databases (e.g., the network database 118, the device database 122, the party$_1$ database 126A, and/or the party$_N$ database 126N), and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet.

The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, the data source device 102, the network gateway 114, the device gateway 120, the party$_1$ gateway 124A, and/or the party$_n$ gateway 124N, a personal computer ("PC"), a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810.

Figure 9:
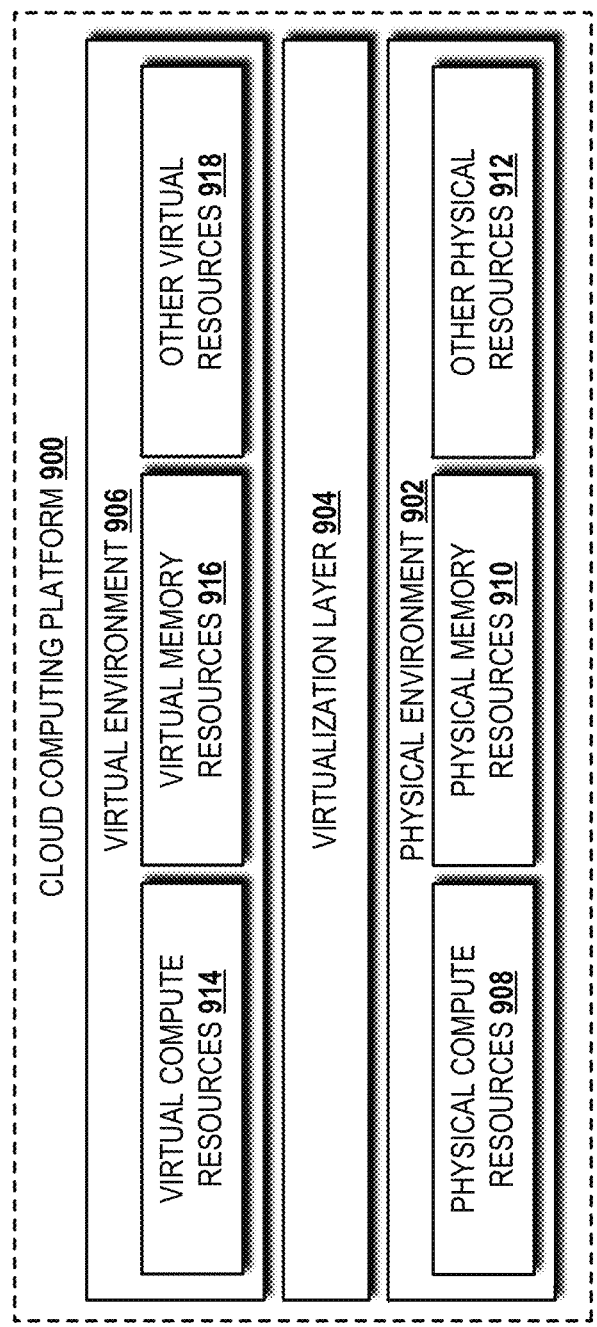
FIG. 9 is a block diagram illustrating an example cloud computing platform that can be used to implement aspects of the concepts and technologies disclosed herein, according to an illustrative embodiment.

Turning now to FIG. 9, an illustrative cloud computing platform 900 will be described, according to an illustrative embodiment. The data source device 102, the network gateway 114, the device gateway 120, the party$_1$ gateway 124A, and/or the party$_n$ gateway 124N, and/or other networks, systems, and/or devices disclosed herein can be implemented and/or controlled, at least in part, in/by the cloud computing platform 900.

The cloud computing platform 900 includes a physical environment 902, a virtualization layer 904, and a virtual environment 906. While no connections are shown in FIG. 9, it should be understood that some, none, or all of the components illustrated in FIG. 9 can be configured to interact with one other to carry out various functions described herein. In some embodiments, the components are arranged so as to communicate via one or more networks. Thus, it should be understood that FIG. 9 and the remaining description are intended to provide a general understanding of a suitable environment in which various aspects of the embodiments described herein can be implemented, and should not be construed as being limiting in any way.

The physical environment 902 provides hardware resources that, in the illustrated embodiment, include one or more physical compute resources 908, one or more physical memory resources 910, and one or more other physical resources 912.

The physical compute resource(s) 908 can include one or more hardware components that perform computations to process data and/or to execute computer-executable instructions of one or more application programs, one or more operating systems, and/or other software. The physical compute resources 908 can include one or more central processing units ("CPUs") configured with one or more processing cores. The physical compute resources 908 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 908 can include one or more discrete GPUs. In some other embodiments, the physical compute resources 908 can include CPU and GPU components that are configured in accordance with a co-processing CPU/GPU computing model, wherein the sequential part of an application executes on the CPU and the computationally-intensive part is accelerated by the GPU processing capabilities. The physical compute resources 908 can include one or more system-on-chip ("SoC") components along with one or more other components, including, for example, one or more of the physical memory resources 910, and/or one or more of the other physical resources 912.

In some embodiments, the physical compute resources 908 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 908 can be or can include one or more hardware components architected in accordance with an ARM architecture, available for license from ARM HOLDINGS of Cambridge, United Kingdom. Alternatively, the physical compute resources 908 can be or can include one or more hardware components architected in accordance with an x86 architecture, such an architecture available from INTEL CORPORATION of Mountain View, Calif., and others. Those skilled in the art will appreciate the implementation of the physical compute resources 908 can utilize various computation architectures, and as such, the physical compute resources 908 should not be construed as being limited to any particular computation architecture or combination of computation architectures, including those explicitly disclosed herein.

The physical memory resource(s) 910 can include one or more hardware components that perform storage/memory operations, including temporary or permanent storage operations. In some embodiments, the physical memory resource(s) 910 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 908.

The other physical resource(s) 912 can include any other hardware resources that can be utilized by the physical compute resources(s) 908 and/or the physical memory resource(s) 910 to perform operations described herein. The other physical resource(s) 912 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 902 can be virtualized by one or more virtual machine monitors (not shown; also known as "hypervisors") operating within the virtualization/control layer 904 to create virtual resources that reside in the virtual environment 906. The virtual machine monitors can be or can include software, firmware, and/or hardware that alone or in combination with other software, firmware, and/or hardware, creates and manages virtual resources operating within the virtual environment 906.

The virtual resources operating within the virtual environment 906 can include abstractions of at least a portion of the physical compute resources 908, the physical memory resources 910, and/or the other physical resources 912, or any combination thereof, shown as virtual compute resources 914, virtual memory resources 916, and other virtual resources 918, respectively. In some embodiments, the abstractions can include one or more virtual machines upon which one or more applications can be executed.

Figure 10:
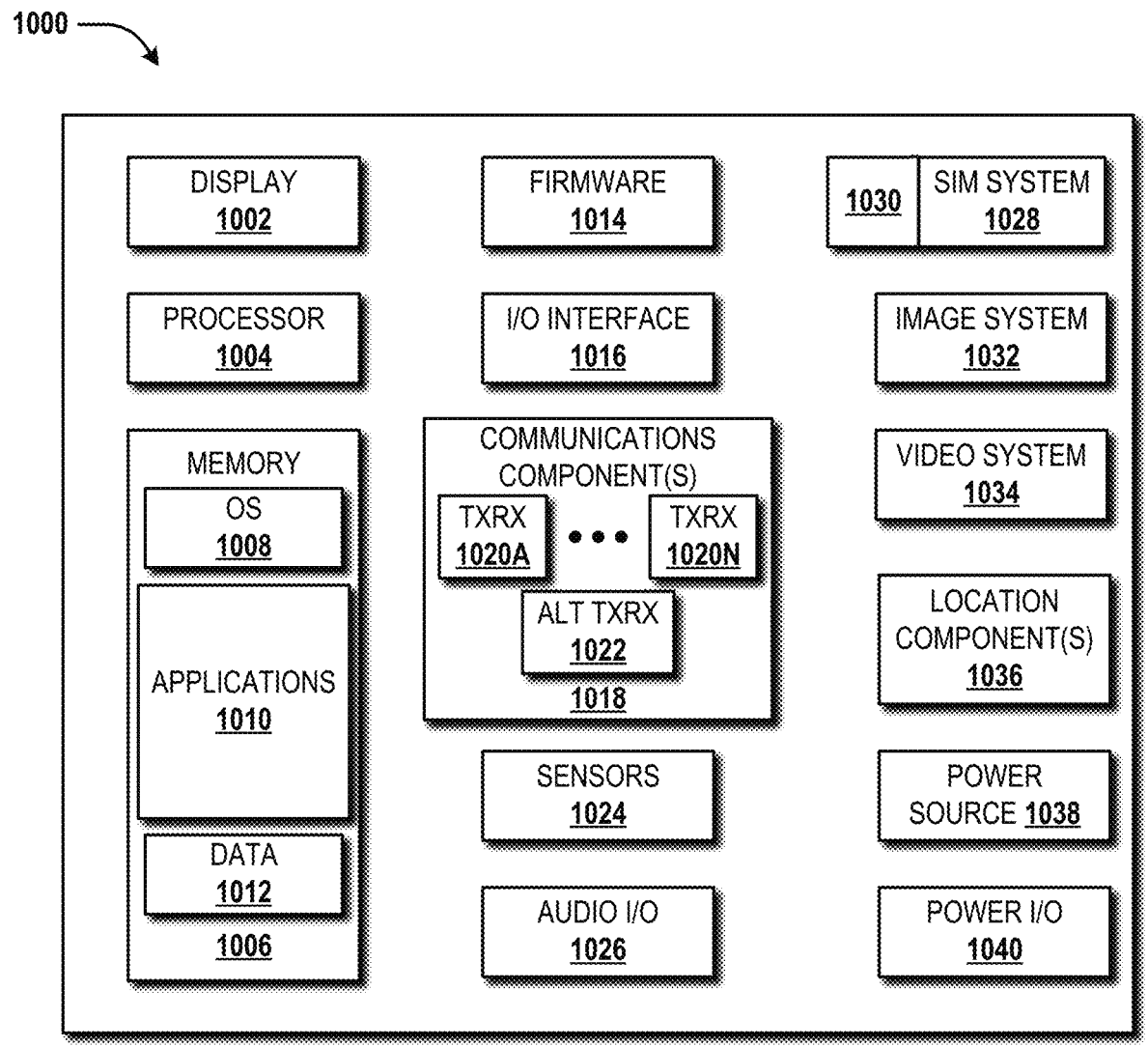
FIG. 10 is a block diagram illustrating an example mobile device and components thereof, according to an illustrative embodiment.

Turning now to FIG. 10, an illustrative mobile device 1000 and components thereof will be described. In some embodiments, the data source device 102, the network gateway 114, the device gateway 120, the party$_1$ gateway 124A, and/or the party$_n$ gateway 124N described above can be configured as and/or can have an architecture similar or identical to the mobile device 1000 described herein in FIG. 10. While connections are not shown between the various components illustrated in FIG. 10, it should be understood that some, none, or all of the components illustrated in FIG. 10 can be configured to interact with one another to carry out various device functions. In some embodiments, the components are arranged so as to communicate via one or more busses (not shown). Thus, it should be understood that FIG. 10 and the following description are intended to provide a general understanding of a suitable environment in which various aspects of embodiments can be implemented, and should not be construed as being limiting in any way.

As illustrated in FIG. 10, the mobile device 1000 can include a display 1002 for displaying data. According to various embodiments, the display 1002 can be configured to display data described herein, network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 1000 also can include a processor 1004 and a memory or other data storage device ("memory") 1006. The processor 1004 can be configured to process data and/or can execute computer-executable instructions stored in the memory 1006. The computer-executable instructions executed by the processor 1004 can include, for example, an operating system 1008, one or more applications 1010, other computer-executable instructions stored in the memory 1006, or the like. In some embodiments, the applications 1010 also can include a UI application (not illustrated in FIG. 10).

The UI application can interface with the operating system 1008 to facilitate user interaction with functionality and/or data stored at the mobile device 1000 and/or stored elsewhere. In some embodiments, the operating system 1008 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1004 to aid a user in data communications, entering/deleting data, entering and setting user IDs and passwords for device access, configuring settings, manipulating content and/or settings, multimode interaction, interacting with other applications 1010, and otherwise facilitating user interaction with the operating system 1008, the applications 1010, and/or other types or instances of data 1012 that can be stored at the mobile device 1000.

The applications 1010, the data 1012, and/or portions thereof can be stored in the memory 1006 and/or in a firmware 1014, and can be executed by the processor 1004. The firmware 1014 also can store code for execution during device power up and power down operations. It can be appreciated that the firmware 1014 can be stored in a volatile or non-volatile data storage device including, but not limited to, the memory 1006 and/or a portion thereof.

The mobile device 1000 also can include an input/output ("I/O") interface 1016. The I/O interface 1016 can be configured to support the input/output of data such as location information, presence status information, user IDs, passwords, and application initiation (start-up) requests. In some embodiments, the I/O interface 1016 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1000 can be configured to synchronize with another device to transfer content to and/or from the mobile device 1000. In some embodiments, the mobile device 1000 can be configured to receive updates to one or more of the applications 1010 via the I/O interface 1016, though this is not necessarily the case. In some embodiments, the I/O interface 1016 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1016 may be used for communications between the mobile device 1000 and a network device or local device.

The mobile device 1000 also can include a communications component 1018. The communications component 1018 can be configured to interface with the processor 1004 to facilitate wired and/or wireless communications with one or more networks. In some embodiments, the communications component 1018 includes a multimode communications subsystem for facilitating communications via the cellular network and one or more other networks.

The communications component 1018, in some embodiments, includes one or more transceivers. The one or more transceivers, if included, can be configured to communicate over the same and/or different wireless technology standards with respect to one another. For example, in some embodiments, one or more of the transceivers of the communications component 1018 may be configured to communicate using GSM, CDMAONE, CDMA2000, LTE, and various other 2 G, 2.5 G, 3 G, 4 G, 4.5 G, 5 G, and greater generation technology standards. Moreover, the communications component 1018 may facilitate communications over various channel access methods (which may or may not be used by the aforementioned standards) including, but not limited to, TDMA, FDMA, W-CDMA, OFDM, SDMA, and the like.

In addition, the communications component 1018 may facilitate data communications using GPRS, EDGE, the HSPA protocol family including HSDPA, EUL or otherwise termed HSDPA, HSPA+, and various other current and future wireless data access standards. In the illustrated embodiment, the communications component 1018 can include a first transceiver ("TxRx") 1020A that can operate in a first communications mode (e.g., GSM). The communications component 1018 also can include an Nth transceiver ("TxRx") 1020N that can operate in a second communications mode relative to the first transceiver 1020A (e.g., UMTS). While two transceivers 1020A-1020N (hereinafter collectively and/or generically referred to as "transceivers 1020") are shown in FIG. 10, it should be appreciated that less than two, two, and/or more than two transceivers 1020 can be included in the communications component 1018.

The communications component 1018 also can include an alternative transceiver ("Alt TxRx") 1022 for supporting other types and/or standards of communications. According to various contemplated embodiments, the alternative transceiver 1022 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1018 also can facilitate reception from terrestrial radio networks, digital satellite radio networks, internet-based radio service networks, combinations thereof, and the like. The communications component 1018 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1000 also can include one or more sensors 1024. The sensors 1024 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 1000 may be provided by an audio I/O component 1026. The audio I/O component 1026 of the mobile device 1000 can include one or more speakers for the output of audio signals, one or more microphones for the collection and/or input of audio signals, and/or other audio input and/or output devices.

The illustrated mobile device 1000 also can include a subscriber identity module ("SIM") system 1028. The SIM system 1028 can include a universal SIM ("USIM"), a universal integrated circuit card ("UICC") and/or other identity devices. The SIM system 1028 can include and/or can be connected to or inserted into an interface such as a slot interface 1030. In some embodiments, the slot interface 1030 can be configured to accept insertion of other identity cards or modules for accessing various types of networks. Additionally, or alternatively, the slot interface 1030 can be configured to accept multiple subscriber identity cards. Because other devices and/or modules for identifying users and/or the mobile device 1000 are contemplated, it should be understood that these embodiments are illustrative, and should not be construed as being limiting in any way.

The mobile device 1000 also can include an image capture and processing system 1032 ("image system"). The image system 1032 can be configured to capture or otherwise obtain photos, videos, and/or other visual information. As such, the image system 1032 can include cameras, lenses, charge-coupled devices ("CCDs"), combinations thereof, or the like. The mobile device 1000 may also include a video system 1034. The video system 1034 can be configured to capture, process, record, modify, and/or store video content. Photos and videos obtained using the image system 1032 and the video system 1034, respectively, may be added as message content to an MMS message, email message, and sent to another device. The video and/or photo content also can be shared with other devices via various types of data transfers via wired and/or wireless communication devices as described herein.

The mobile device 1000 also can include one or more location components 1036. The location components 1036 can be configured to send and/or receive signals to determine a geographic location of the mobile device 1000. According to various embodiments, the location components 1036 can send and/or receive signals from global positioning system ("GPS") devices, assisted-GPS ("A-GPS") devices, WI-FI/WIMAX and/or cellular network triangulation data, combinations thereof, and the like. The location component 1036 also can be configured to communicate with the communications component 1018 to retrieve triangulation data for determining a location of the mobile device 1000. In some embodiments, the location component 1036 can interface with cellular network nodes, telephone lines, satellites, location transmitters and/or beacons, wireless network transmitters and receivers, combinations thereof, and the like. In some embodiments, the location component 1036 can include and/or can communicate with one or more of the sensors 1024 such as a compass, an accelerometer, and/or a gyroscope to determine the orientation of the mobile device 1000. Using the location component 1036, the mobile device 1000 can generate and/or receive data to identify its geographic location, or to transmit data used by other devices to determine the location of the mobile device 1000. The location component 1036 may include multiple components for determining the location and/or orientation of the mobile device 1000.

The illustrated mobile device 1000 also can include a power source 1038. The power source 1038 can include one or more batteries, power supplies, power cells, and/or other power subsystems including alternating current ("AC") and/or direct current ("DC") power devices. The power source 1038 also can interface with an external power system or charging equipment via a power I/O component 1040. Because the mobile device 1000 can include additional and/or alternative components, the above embodiment should be understood as being illustrative of one possible operating environment for various embodiments of the concepts and technologies described herein. The described embodiment of the mobile device 1000 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 1000 or other devices or computers described herein, such as the computer system 1600 described above with reference to FIG. 10. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 1000 in order to store and execute the software components presented herein. It is also contemplated that the mobile device 1000 may not include all of the components shown in FIG. 10, may include other components that are not explicitly shown in FIG. 10, or may utilize an architecture completely different than that shown in FIG. 10.

Based on the foregoing, it should be appreciated that aspects of proximity routing policy enforcement for transborder IoT data governance compliance have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A network gateway comprising:
a processor; and
a memory comprising instructions that, when executed by the processor, cause the processor to perform operations comprising
receiving, from a data source device, a device registration message comprising a device registration header,
determining, based upon the device registration header and a data governance policy, whether the data source device is permitted to access a data governance zone,
in response to determining that the data source device is permitted to access the data governance zone, determining, based upon a further data governance policy, at least one gateway of a plurality of gateways operating in the data governance zone to which the device registration message is to be forwarded, wherein the plurality of gateways comprises a home device gateway and a home third party gateway,
forwarding the device registration message to the at least one gateway so that the at least one gateway is enabled for device operation, and
receiving, from the data source device, a data message comprising a plurality of data segments comprising a first data segment associated with a network owner, a second data segment associated with a device owner, and a third data segment associated with a third party owner, wherein the network gateway is associated with the network owner, the home device gateway is associated with the device owner, and the home third party gateway is associated with the third party owner.

2. The network gateway of claim 1, wherein the device registration header comprises a plurality of data fields that uniquely identify the data source device, a network location of the data source device, and a network to which the data source device is connected.

3. The network gateway of claim 2, wherein the data governance zone comprises a home data governance zone.

4. The network gateway of claim 3, wherein determining, based upon the device registration header and the data governance policy, whether the data source device is permitted to access the data governance zone comprises determining, based upon the device registration header and the data governance policy, whether the data source device is permitted to access the home data governance zone; and wherein the operations further comprise, in response to determining, based upon the device registration header and the data governance policy, that the data source device is not permitted to access the home data governance zone, generating a registration redirect message to inform the data source device of a visited network gateway to which the device registration message should be redirected, wherein the visited network gateway is associated with a visited data governance zone.

5. The network gateway of claim 4, wherein the operations further comprise receiving, from the visited network gateway, a transaction identifier that uniquely identifies the data message sent by the data source device and received by the visited network gateway.

6. A method comprising:
receiving, by a network gateway comprising a processor, from a data source device, a device registration message comprising a device registration header;
determining, by the network gateway, based upon the device registration header and a data governance policy, whether the data source device is permitted to access a data governance zone;
in response to determining that the data source device is permitted to access the data governance zone, determining, by the network gateway, based upon a further data governance policy, at least one gateway of a plurality of gateways operating in the data governance zone to which the device registration message is to be forwarded, wherein the plurality of gateways comprises a home device gateway and a home third party gateway,
forwarding, by the network gateway, the device registration message to the at least one gateway so that the at least one gateway is enabled for device operation, and
receiving, from the data source device, a data message comprising a plurality of data segments comprising a first data segment associated with a network owner, a second data segment associated with a device owner, and a third data segment associated with a third party owner, wherein the network gateway is associated with the network owner, the home device gateway is associated with the device owner, and the home third party gateway is associated with the third party owner.

7. The method of claim 6, wherein the device registration header comprises a plurality of data fields that uniquely identify the data source device, a network location of the data source device, and a network to which the data source device is connected.

8. The method of claim 7, wherein the data governance zone comprises a home data governance zone.

9. The method of claim 8, wherein determining, by the network gateway, based upon the device registration header and the data governance policy, whether the data source device is permitted to access the data governance zone comprises determining, by the network gateway, based upon the device registration header and the data governance policy, whether the data source device is permitted to access the home data governance zone; and wherein the method further comprises, in response to determining, based upon the device registration header and the data governance policy, that the data source device is not permitted to access the home data governance zone, generating, by the network gateway, a registration redirect message to inform the data source device of a visited network gateway to which the device registration message should be redirected, wherein the visited network gateway is associated with a visited data governance zone.

10. The method of claim 9, further comprising receiving, by the network gateway, from the visited network gateway, a transaction identifier that uniquely identifies the data message sent by the data source device and received by the visited network gateway.

11. The method of claim 6, wherein the data source device comprises an IoT device.

12. The method of claim 6, wherein the data source device comprises a combination of an IoT device and an asset.

13. A computer-readable storage medium comprising computer-executable instructions that, when executed, cause a processor of a network gateway to perform operations comprising:
- receiving, from a data source device, a device registration message comprising a device registration header;
- determining, based upon the device registration header and a data governance policy, whether the data source device is permitted to access a data governance zone;
- in response to determining that the data source device is permitted to access the data governance zone, determining, based upon a further data governance policy, at least one gateway of a plurality of gateways operating in the data governance zone to which the device registration message is to be forwarded, wherein the plurality of gateways comprises a home device gateway and a home third party gateway;
- forwarding the device registration message to the at least one gateway so that the at least one gateway is enabled for device operation; and
- receiving, from the data source device, a data message comprising a plurality of data segments comprising a first data segment associated with a network owner, a second data segment associated with a device owner, and a third data segment associated with a third party owner, wherein the network gateway is associated with the network owner, the home device gateway is associated with the device owner, and the home third party gateway is associated with the third party owner.

14. The computer-readable storage medium of claim 13, wherein the device registration header comprises a plurality of data fields that uniquely identify the data source device, a network location of the data source device, and a network to which the data source device is connected.

15. The computer-readable storage medium of claim 14, wherein the data governance zone comprises a home data governance zone.

16. The computer-readable storage medium of claim 15, wherein determining, based upon the device registration header and the data governance policy, whether the data source device is permitted to access the data governance zone comprises determining, based upon the device registration header and the data governance policy, whether the data source device is permitted to access the home data governance zone; and wherein the operations further comprise, in response to determining, based upon the device registration header and the data governance policy, that the data source device is not permitted to access the home data governance zone, generating a registration redirect message to inform the data source device of a visited network gateway to which the device registration message should be redirected, wherein the visited network gateway is associated with a visited data governance zone.

17. The computer-readable storage medium of claim 16, wherein the operations further comprise receiving, from the visited network gateway, a transaction identifier that uniquely identifies the data message received by the visited network gateway.

* * * * *